United States Patent
Strodiot et al.

(10) Patent No.: US 12,527,742 B2
(45) Date of Patent: Jan. 20, 2026

(54) METHODS FOR MANUFACTURING A LIPOSOME ENCAPSULATED RNA

(71) Applicant: GLAXOSMITHKLINE BIOLOGICALS S.A., Rixensart (BE)

(72) Inventors: Laurent Bernard Jean Strodiot, Rixensart (BE); Geraldine Minet, Rixensart (BE)

(73) Assignee: GlaxoSmithKline Biologicals S.A., Rixensart (BE)

(*) Notice: Subject to any disclaimer, the term of this patent is extended or adjusted under 35 U.S.C. 154(b) by 195 days.

(21) Appl. No.: 16/617,016

(22) PCT Filed: May 30, 2018

(86) PCT No.: PCT/IB2018/053850
§ 371 (c)(1),
(2) Date: Nov. 26, 2019

(87) PCT Pub. No.: WO2018/220553
PCT Pub. Date: Dec. 6, 2018

(65) Prior Publication Data
US 2021/0128474 A1 May 6, 2021

Related U.S. Application Data

(60) Provisional application No. 62/512,501, filed on May 30, 2017.

(51) Int. Cl.
*A61K 9/1277* (2025.01)
*A61K 9/1272* (2025.01)
*A61K 31/7105* (2006.01)

(52) U.S. Cl.
CPC .......... *A61K 9/1277* (2013.01); *A61K 9/1272* (2013.01); *A61K 31/7105* (2013.01)

(58) Field of Classification Search
None
See application file for complete search history.

(56) References Cited

U.S. PATENT DOCUMENTS

| | | |
|---|---|---|
| 6,113,918 A | 9/2000 | Johnson et al. |
| 6,846,489 B1 | 1/2005 | Garcon et al. |
| 7,998,913 B2 | 8/2011 | Numajiri |
| 8,563,325 B1 | 10/2013 | Bartsch et al. |
| 8,608,114 B2 | 12/2013 | Smith et al. |

(Continued)

FOREIGN PATENT DOCUMENTS

| | | |
|---|---|---|
| CN | 1480136 A | 3/2004 |
| CN | 102133186 A | 7/2011 |

(Continued)

OTHER PUBLICATIONS

Shyam Garg, Gesine Heuck, Shell Ip and Euan Ramsay. "Microfluidics: a transformational tool for nanomedicine development and production." Journal of Drug Targeting, vol. 24, No. 9, 2016, pp. 821-835. (Year: 2016).*

(Continued)

*Primary Examiner* — Isaac Shomer
(74) *Attorney, Agent, or Firm* — Christopher Lee Wright

(57) ABSTRACT

Methods for manufacturing a non-viral delivery system comprising a liposome encapsulating an RNA using a microfluidic device and compositions for use therein are provided.

30 Claims, 12 Drawing Sheets

(56) References Cited

U.S. PATENT DOCUMENTS

| | | | |
|---|---|---|---|
| 8,722,064 B2 | 5/2014 | Reed et al. | |
| 9,168,645 B2 | 10/2015 | Wassenhoven et al. | |
| 9,198,645 B2 | 12/2015 | Jahn et al. | |
| 9,750,812 B2 | 9/2017 | Ali et al. | |
| 11,243,494 B2 | 2/2022 | Mueth et al. | |
| 11,844,828 B2 | 12/2023 | Bertaud et al. | |
| 2001/0053365 A1 | 12/2001 | Friede et al. | |
| 2002/0097633 A1 | 7/2002 | O'Connor et al. | |
| 2002/0098122 A1* | 7/2002 | Singh | B01L 3/5027 422/400 |
| 2005/0112184 A1 | 5/2005 | Jahn et al. | |
| 2007/0242560 A1 | 10/2007 | Norikane et al. | |
| 2010/0022007 A1 | 1/2010 | Kenis et al. | |
| 2010/0182868 A1 | 7/2010 | Woehl | |
| 2010/0202928 A1 | 8/2010 | Gaitan et al. | |
| 2011/0212167 A1 | 9/2011 | Ali et al. | |
| 2012/0276209 A1* | 11/2012 | Cullis | A61K 9/146 424/490 |
| 2012/0321694 A1 | 12/2012 | Larocque et al. | |
| 2013/0119570 A1 | 5/2013 | Sugiura et al. | |
| 2013/0168885 A1* | 7/2013 | Omiatek | A61K 9/1277 264/4.1 |
| 2013/0195969 A1 | 8/2013 | Geall et al. | |
| 2013/0202684 A1* | 8/2013 | Geall | A61K 39/39 424/450 |
| 2015/0017191 A1 | 1/2015 | Fox et al. | |
| 2015/0110854 A1 | 4/2015 | Shaw et al. | |
| 2015/0115488 A1 | 4/2015 | Hood et al. | |
| 2015/0182461 A1* | 7/2015 | Kim | A61K 9/145 514/772.3 |
| 2016/0051954 A1 | 2/2016 | Brujic et al. | |
| 2016/0214103 A1 | 7/2016 | Cullis et al. | |
| 2016/0276209 A1 | 9/2016 | Usenko | |
| 2016/0324783 A1 | 11/2016 | Fox et al. | |
| 2016/0361411 A1 | 12/2016 | Gindy et al. | |
| 2017/0071967 A1 | 3/2017 | Dutta et al. | |
| 2017/0144123 A1 | 5/2017 | Tabeling et al. | |
| 2017/0333348 A1 | 11/2017 | Kim et al. | |
| 2021/0069321 A1 | 3/2021 | Schneider-Ohrum et al. | |
| 2021/0128474 A1 | 5/2021 | Strodiot et al. | |
| 2021/0162042 A1 | 6/2021 | Harvengt et al. | |
| 2022/0032247 A1 | 2/2022 | Buesink et al. | |
| 2022/0339282 A1 | 10/2022 | Harvengt et al. | |
| 2023/0172858 A1 | 6/2023 | Castellanos Mantilla et al. | |
| 2023/0277657 A1 | 9/2023 | Jehoulet et al. | |

FOREIGN PATENT DOCUMENTS

| | | | |
|---|---|---|---|
| CN | 102302453 A | 1/2012 | |
| CN | 102327224 A | 1/2012 | |
| CN | 103796642 A | 5/2014 | |
| CN | 106902081 A | 6/2017 | |
| EP | 1 473 084 A2 | 11/2004 | |
| EP | 1 810 746 A1 | 7/2007 | |
| EP | 2 596 858 A1 | 5/2013 | |
| EP | 2 364 720 B1 | 5/2014 | |
| EP | 2 759 344 A2 | 7/2014 | |
| FR | 3 043 919 A1 | 5/2017 | |
| JP | 2008-163010 A | 7/2008 | |
| WO | WO 96/33739 A1 | 10/1996 | |
| WO | WO 98/15287 A1 | 4/1998 | |
| WO | WO 00/07621 A2 | 2/2000 | |
| WO | WO 2005/103106 A1 | 11/2005 | |
| WO | WO 2005/112991 A2 | 12/2005 | |
| WO | WO 2007/062831 A1 | 6/2007 | |
| WO | WO 2009/136300 A2 | 11/2009 | |
| WO | WO 2010/142685 A1 | 12/2010 | |
| WO | WO 2010/142686 A1 | 12/2010 | |
| WO | 2011/140627 A1 | 11/2011 | |
| WO | 2012/030901 A1 | 3/2012 | |
| WO | WO 2013/041572 A1 | 3/2013 | |
| WO | WO 2015/063710 A1 | 5/2015 | |
| WO | 2015/095340 A1 | 6/2015 | |
| WO | WO-2015095346 A1 * | 6/2015 | A61K 31/7105 |
| WO | WO 2015/148764 A1 | 10/2015 | |
| WO | 2016/037053 A1 | 3/2016 | |
| WO | WO-2016138175 A1 * | 9/2016 | A61K 9/1682 |
| WO | WO 2017/097783 A1 | 6/2017 | |
| WO | WO 2017/200957 A1 | 11/2017 | |
| WO | WO 2018/219521 A1 | 12/2018 | |
| WO | WO 2018/220553 A1 | 12/2018 | |

OTHER PUBLICATIONS

Alex K. K. Leung, Yuen Yi C. Tam, Sam Chen, Ismail M. Hafez, and Pieter R. Cullis. "Microfluidic Mixing: A General Method for Encapsulating Macromolecules in Lipid Nanoparticle Systems." The Journal of Physical Chemistry B, vol. 119, 2015, pp. 8698-8706. (Year: 2015).*

Svetlana Ignatova et al. "Feasibility of scaling from pilot to process scale." Journal of Chromatography A, 1151 (2007) pp. 20-24. (Year: 2007).*

Hind Mamoun Beheiry et al. "Effect of pre-eclampsia on glomerular filtration rate in Sudanese women." International Journal of Research in Medical Sciences, vol. 5 Issue 3, Mar. 2017, pp. 1053-1057. (Year: 2017).*

Gujrati, et al. "Multifunctional pH-Sensitive Amino Lipids for siRNA Delivery" Bioconjugate Chemistry; 2015; pp. 19-35; vol. 27(1).

"Lab-on-a-Chip Catalogue," Microfluidic ChipShop GmbH, Jan. 2018, 294 pages total.

"Lab-on-a-Chip Catalogue," Microfluidic ChipShop GmbH, Oct. 2016, 246 pages total.

Arias et al., "Glucopyranosyl lipid adjuvant (GLA), a synthetic TLR4 agonist, promotes potent systemic and mucosal responses to intranasal immunization with HIVgp140," PLoS One, vol. 7, Issue 7, e41144, Jul. 2012, pp. 1-8.

Black et al., "Developing vaccines for an aging population," Science Translational Medicine, vol. 7, Issue 281, 281ps8, Apr. 1, 2015, pp. 1-7.

Coler et al., "Development and characterization of synthetic glucopyranosyl lipid adjuvant system as a vaccine adjuvant," PLoS One, vol. 6, Issue 1, e16333, Jan. 2011, pp. 1-12.

Dalsgaard, "Saponin adjuvants: III. Isolation of a substance from Quillaja saponaria molina with adjuvant activity in foot-and-mouth disease vaccines," Archiv für die gesamte Virusforschung, vol. 44, 1974, pp. 243-254.

Damiati et al., "Microfluidic devices for drug delivery systems and drug screening," Genes, vol. 9, No. 103, 2018, pp. 1-24.

De Becker et al., "The adjuvant monophosphoryl lipid A increases the function of antigen-presenting cells," International Immunology, vol. 12, No. 6, 2000, pp. 807-815.

Dendouga et al., "Cell-mediated immune responses to a varicella-zoster virus glycoprotein E vaccine using both a TLR agonist and QS21 in mice," Vaccine, vol. 30, 2012, pp. 3126-3135.

Didierlaurent et al., "Adjuvant system AS01: helping to overcome the challenges of modern vaccines," Expert Review of Vaccines, vol. 16, No. 1, 2017, pp. 55-63.

Didierlaurent et al., "Enhancement of adaptive immunity by the human vaccine adjuvant AS01 depends on activated dendritic cells," The Journal of Immunology, vol. 193, No. 4, 2014, pp. 1920-1930.

Dillon et al., "Molecular characterization and human T-cell responses to a member of a novel *Mycobacterium tuberculosis* mtb39 gene family," Infection and Immunity, vol. 67, No. 6, Jun. 1999, pp. 2941-2950.

Fochesato et al., "Comparative preclinical evaluation of AS01 versus other adjuvant systems in a candidate herpes zoster glycoprotein E subunit vaccine," Human Vaccines & Immunotherapeutics, vol. 12, No. 8, 2016, pp. 2092-2095.

Fung et al., "Optimizing manufacturing and composition of a TLR4 nanosuspension: physicochemical stability and vaccine adjuvant activity," Journal of Nanobiotechnology, vol. 11, No. 43, 2013, pp. 1-12.

(56) References Cited

OTHER PUBLICATIONS

Garcon et al., "Recent clinical experience with vaccines using MPL-and QS-21-containing adjuvant systems," Expert Review of Vaccines, vol. 10, No. 4, 2011, pp. 471-486.
Geall et al., "Nonviral delivery of self-amplifying RNA vaccines," Proceedings of the National Academy of Sciences, vol. 109, No. 36, Sep. 4, 2012, pp. 14604-14609.
Haumont et al., "Purification, characterization and immunogenicity of recombinant varicella-zoster virus glycoprotein gE secreted by Chinese hamster ovary cells," Virus Research, vol. 40, 1996, pp. 199-204.
Helmminen et al., "A major outer membrane protein of Moraxella catarrhalis is a target for antibodies that enhance pulmonary clearance of the pathogen in an animal model," Infection and Immunity, vol. 61, No. 5, May 1993, pp. 2003-2010.
Hood et al., "High-throughput continuous flow production of nanoscale liposomes by microfluidic vertical flow focusing," Small, vol. 11, No. 43, 2015, pp. 5790-5799.
Ismaili et al. "Monophosphoryl lipid A activates both human dendritic cells and T cells," The Journal of Immunology, vol. 168, No. 2, 2002, pp. 926-932.
Jahn et al., "Microfluidic directed formation of liposomes of controlled size," Langmuir, vol. 23, No. 11, 2007, pp. 6289-6293.
Javaid et al., "Analysis of passive mixing in a serpentine microchannel with sinusoidal side walls," Micromachines, vol. 9, No. 8, 2018, pp. 1-15.
Jeffs et al., "A scalable, extrusion-free method for efficient liposomal encapsulation of plasmid DNA," Pharmaceutical Research, vol. 22, No. 3, Mar. 2005, pp. 362-372.
Joshi et al., "Microfluidics based manufacture of liposomes simultaneously entrapping hydrophilic and lipophilic drugs," International Journal of Pharmaceutics, vol. 514, 2016, pp. 160-168.
Karthikeyan et al., "Numerical modeling and parametric optimization of micromixer for low diffusivity fluids," International Journal of Chemical Reactor Engineering, 20160231, 2018, pp. 1-11.
Kastner et al., "High-throughput manufacturing of size-tuned liposomes by a new microfluidics method using enhanced statistical tools for characterization," International Journal of Pharmaceutics, vol. 477. 2015, pp. 361-368.
Kensil et al., "QS-21: a water-soluble triterpene glycoside adjuvant," Expert Opinion on Investigational Drugs, vol. 7, No. 9, 1998, pp. 1475-1482.
Kensil et al., "Separation and characterization of saponins with adjuvant activity from Quillaja saponaria Molina cortex," The Journal of Immunology, vol. 146, No. 2, Jan. 15, 1991, pp. 431-437.
Kim et al., "Mass production and size control of lipid-polymer hybrid nanoparticles through controlled microvortices," Nano Letters, vol. 12, published Jun. 20, 2012, Correction published Sep. 17, 2013, pp. 3587-3591.
Lambrecht et al., "Mechanism of action of clinically approved adjuvants," Current Opinion in Immunology, vol. 21, 2009, pp. 23-29.
Leroux-Roels et al., "A phase 1/2 clinical trial evaluating safety and immunogenicity of a varicella zoster glycoprotein E subunit vaccine candidate in young and older adults," The Journal of Infectious Diseases, vol. 206, Oct. 15, 2012, pp. 1280-1290.
Li et al., "Cutting edge: inflammasome activation by alum and alum's adjuvant effect are mediated by NLRP3," The Journal of Immunology, vol. 181, No. 1, 2008, pp. 17-21.
Liang et al., "Simulation and Experiment of Capillary Driven Passive Planar Baffle Micro-mixer," Proceedings of the 10th IEEE International Conference on Nano/Micro Engineered and Molecular Systems, Apr. 7-11, 2015, pp. 120-123.
Livingston et al., "Phase 1 trial of immunological adjuvant QS-21 with a GM2 ganglioside-keyhole limpet haemocyanin conjugate vaccine in patients with malignant melanoma," Vaccine, vol. 12, No. 14, 1994, pp. 1275-1280.
Martin et al., "Role of innate immune factors in the adjuvant activity of monophosphoryl lipid A," Infection and Immunity, vol. 71, No. 5, May 2003, pp. 2498-2507.
Marty-Roix et al., "Identification of QS-21 as an inflammasome-activating molecular component of saponin adjuvants," Journal of Biological Chemistry, vol. 291, No. 3, Jan. 15, 2016, pp. 1123-1136.
Mata-Haro et al., "The vaccine adjuvant monophosphoryl lipid A as a TRIF-biased agonist of TLR4," Science, vol. 316, Jun. 15, 2007, pp. 1628-1632.
McLellan et al. "Structure of RSV fusion glycoprotein trimer bound to a prefusion-specific neutralizing antibody," Science, vol. 340, No. 6136, May 31, 2013, pp. 1113-1117.
McLellan et al., "Structure-based design of a fusion glycoprotein vaccine for respiratory syncytial virus," Science, vol. 342, No. 6158, Nov. 1, 2013, pp. 592-598.
Meijer et al., "Passive and active mixing in microfluidic devices," Macromolecular Symposia, vol. 279, 2009, pp. 201-209.
Newman et al., "Saponin adjuvant induction of ovalbumin-specific CD8+ cytotoxic T lymphocyte responses," Journal of Immunology, vol. 148, No. 8, Apr. 15, 1992, pp. 2357-2362.
Perrie et al., "Designing liposomal adjuvants for the next generation of vaccines," Advanced Drug Delivery Reviews, vol. 99, 2016, pp. 85-96.
Perrie et al., "Microfluidics production of liposomes—from low solubility drugs to vaccines," Nanomedicines: Materials, Manufacturing and Therapeutic Applications, Jul. 16, 2016, 42 pages total.
Ragupathi et al., "Natural and synthetic saponin adjuvant QS-21 for vaccines against cancer," Expert Review of Vaccines, vol. 10, No. 4, Apr. 2011, pp. 463-470 (14 pages total).
Rasouli et al., "Numerical study on low Reynolds mixing of T-shaped micro-mixers with obstacles," Trans. Phenom. Nano Micro Sales, vol. 3, No. 2, 2015, pp. 68-76.
Rigter et al., "A protective and safe intranasal RSV vaccine based on a recombinant prefusion-like form of the F protein bound to bacterium-like particles," PLoS One, vol. 8, Issue 8, e71072, Aug. 2013, pp. 1-14.
Skeiky et al., "Cloning, expression, and immunological evaluation of two putative secreted serine protease antigens of *Mycobacterium tuberculosis*," Infection and Immunity, vol. 67, No. 8, Aug. 1999, pp. 3998-4007.
Skeiky et al., "Differential immune responses and protective efficacy induced by components of a tuberculosis polyprotein vaccine, Mtb72F, delivered as naked DNA or recombinant protein," The Journal of Immunology, vol. 172, No. 12, 2004, pp. 7618-7628.
Soltysik et al., "Structure/function studies of QS-21 adjuvant: assessment of triterpene aldehyde and glucuronic acid roles in adjuvant function," Vaccine, vol. 13, No. 15, 1995, pp. 1403-1410.
Vafai, "Antibody-binding sites on truncated forms of varicella-zoster virus gpI(gE) glycoprotein," Vaccine, vol. 12, No. 14, 1994, pp. 1265-1269.
Vladisavljevic et al. "Industrial lab-on-a-chip: Design, applications and scale-up for drug discovery and delivery," Advanced Drug Delivery Reviews, vol. 65, 2013, pp. 1626-1663.
Yu et al., "Microfluidic Methods for Production of Liposomes," Methods in Enzymology, vol. 465, Chapter 7, 2009, pp. 129-141.
International Search Report for International Application No. PCT/IB2018/053850, mailed Sep. 14, 2018, 4 Pages.
International Search Report for International Application No. PCT/IB2020/053044, mailed Nov. 16, 2020, 3 Pages.
Written Opinion for International Application No. PCT/IB2018/053850, mailed Sep. 14, 2018, 6 Pages.
Written Opinion for International Application No. PCT/IB2020/058044, mailed Nov. 16, 2020, 6 Pages.

\* cited by examiner

METHODS FOR MANUFACTURING A LIPOSOME ENCAPSULATED RNA

CROSS-REFERENCE TO RELATED APPLICATIONS

This application is filed pursuant to 35 U.S.C. § 371 as a United States National Phase Application of International Application No. PCT/IB2018/053850 filed May 30, 2018 which claims priority from U.S. Provisional No. 62/512,501 filed May 30, 2017.

FIELD OF THE INVENTION

The present invention relates to methods for manufacturing a lipid nanoparticle comprising a cationic lipid and a nucleic acid molecule using a microfluidic device and to related aspects.

BACKGROUND TO THE INVENTION

The delivery of nucleic acids for immunising animals has been a goal for several years. Various approaches have been tested, including the use of DNA or RNA, of viral or non-viral delivery vehicles (or even no delivery vehicle, in a "naked" vaccine), of replicating or non-replicating vectors, or of viral or non-viral vectors. Non-viral delivery vehicles include liposomes.

Liposomes may be manufactured by a variety of methods by, for instance, mixing an ethanolic solution of the lipids with an aqueous solution of the nucleic acid and buffer. Methods for mixing can include a process in which feed streams of aqueous nucleic acid solution are combined in a single mixing zone with one stream of a lipid-solvent solution.

There remains a need for new manufacturing approaches which enable the safe, convenient and cost effective production of liposome-encapsulated nucleic acid on a commercially viable scale while preserving the physicochemical characteristics that maintain immunological performance arising from conventional manufacturing approaches.

SUMMARY OF THE INVENTION

Methods for manufacturing a non-viral delivery system comprising a liposome encapsulating an RNA using a microfluidic device and compositions for use therein are provided. The methods and microfluidic device may be used to manufacture a non-viral delivery system comprising a liposome encapsulating an RNA on a commercially viable scale.

In some embodiments, methods of manufacturing a non-viral delivery system comprising a liposome encapsulating an RNA using a microfluidic device comprise the steps of: mixing in the device a first solution comprising a solvent and a cationic lipid; and a second solution comprising water and the RNA; and removing the solvent. In some embodiments, methods of manufacturing a non-viral delivery system comprising a liposome encapsulating an RNA using a microfluidic device comprise the steps of: mixing in the device a first solution comprising a solvent, a cationic lipid, DSPC, a sterol, and a PEGylated lipid selected from PEG-PE and PEG-DMG; and a second solution comprising water and the RNA; and removing the solvent.

In some embodiments, the methods utilize a stock solution comprising a solvent and 1-10 mg/mL lipid. In some embodiments, the solvent comprises ethanol. In some embodiments, the stock solution further comprises water, wherein the ratio of water to ethanol is less than 3:7.

DESCRIPTION OF DRAWINGS/FIGURES

Figure 10:
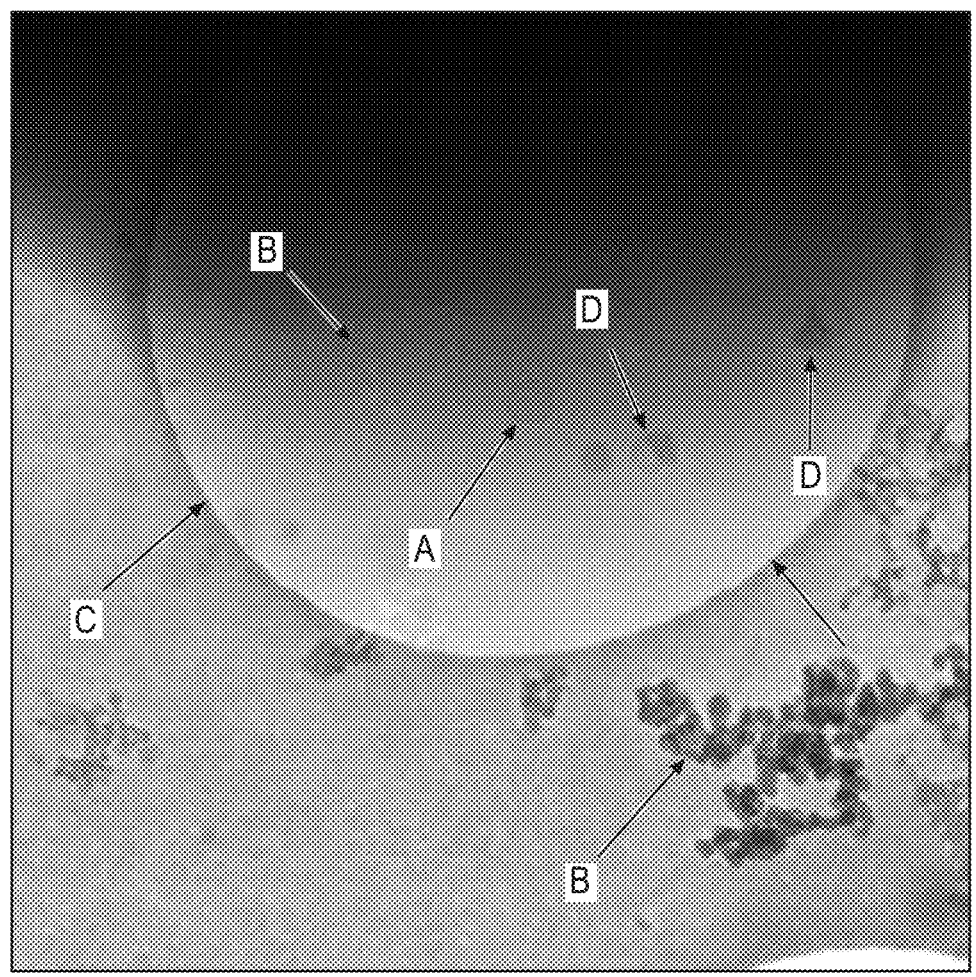

FIG. 10. Arrow A: LNP with homogenous contrast. Arrow B: Ice crystals. Arrow C: Edges of the holes. Arrow D: LNP with heterogeneous material density.

Figure 11:
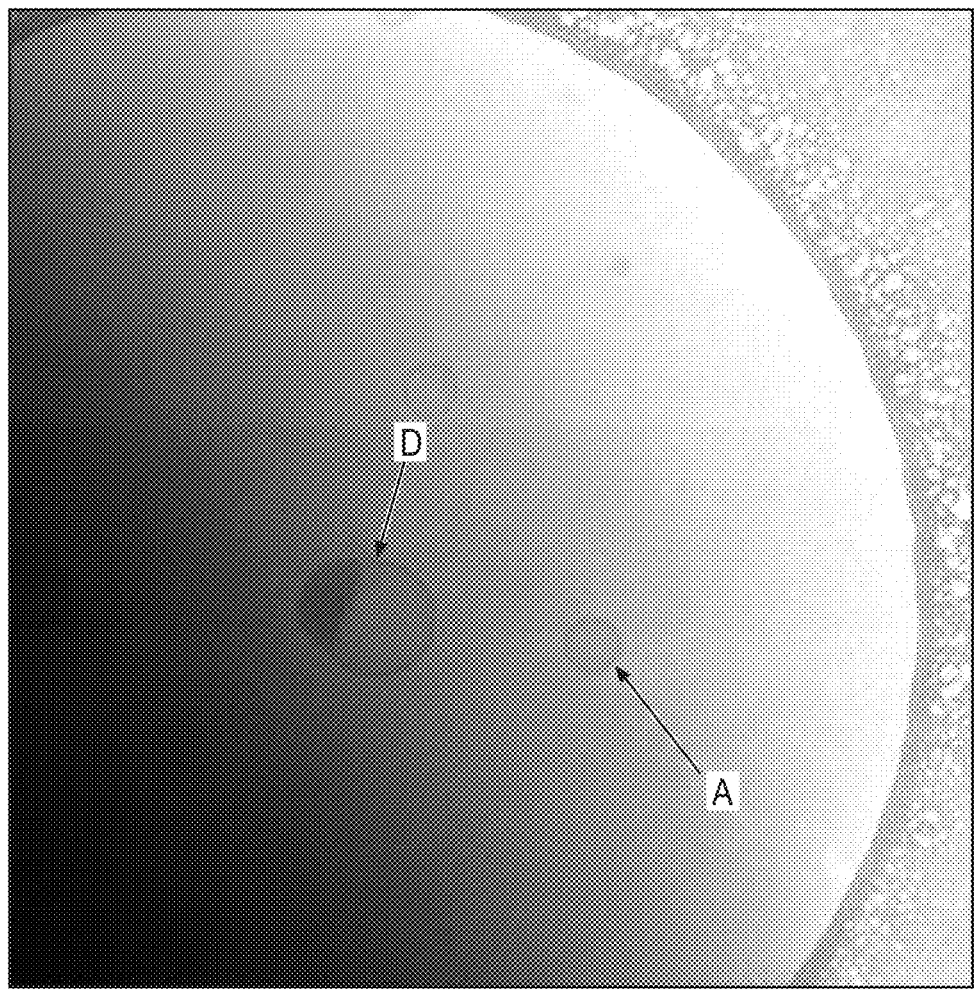

FIG. 11. Arrow A: LNP with homogenous contrast. Arrow D: LNP with heterogeneous material density.

Figure 12:
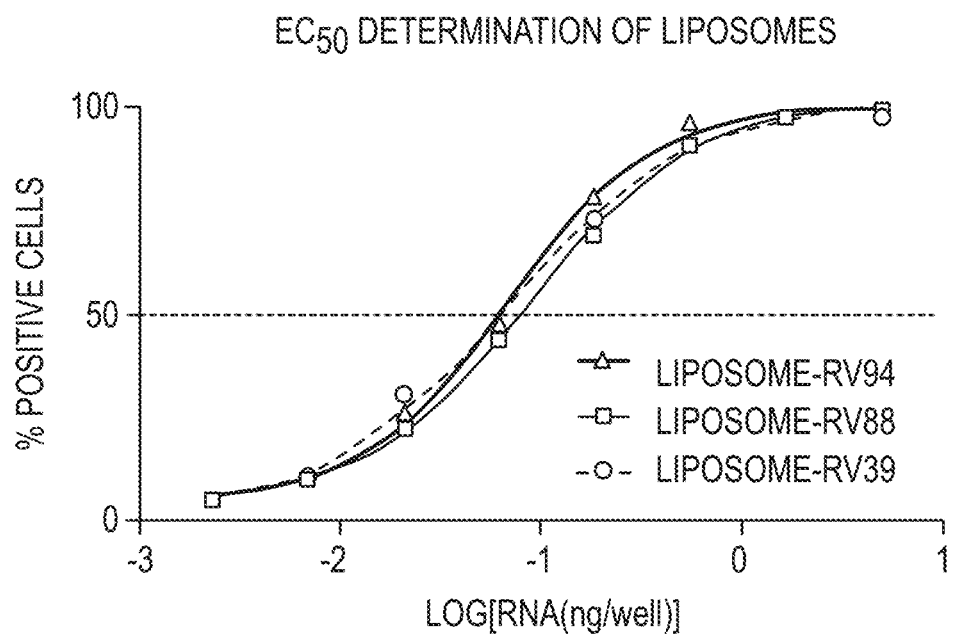

FIG. 12. EC50 Determination of RV39- (circles), RV88- (squares), and RV94- (triangles) based liposmes deliverying the mRNA encoding the Rabies G-protein antigen.

DETAILED DESCRIPTION OF THE INVENTION

Definitions

By "hindered ester group" is intended a sterically crowded environment around the $C(=O)$ due to the presence of bulk substituents, such as cyclic or branched moieties.

By "lipid" is intended a class of organic compounds that are fatty acids or their derivatives and are insoluble in water but soluble in organic solvents, including natural oils, waxes, and steroids (for example, sterols, including cholesterol).

By "liposome" is intended a microvesicle composed of one or more bilayers of lipidic amphipathic molecules that may enclose one or more aqueous compartments.

Non-Viral Delivery Systems
Liposomes

The methods of manufacturing a non-viral delivery system comprising a liposome encapsulating an RNA utilize a scalable microfluidic device as described elsewhere herein. The invention utilizes liposomes within which polypeptide-encoding RNA is encapsulated. Thus the RNA is (as in a natural. virus) separated from any external medium. Encapsulation within the liposome has been found to protect RNA from RNase digestion. The liposomes can include some external RNA (e.g. on their surface), but at least half of the RNA (such as at least 75%, at least 90%, and ideally all of it) is encapsulated in the liposome's core. Encapsulation within liposomes is distinct from, for instance, the RNA complexes where RNA is mixed with pre-formed liposomes.

Liposomes are usually divided into three groups: multi-lamellar vesicles (ML V); small unilamellar vesicles (SUV); and large unilamellar vesicles (LUV). MLVs have multiple bilayers in each vesicle, forming several separate aqueous compartments. SUVs and LUVs have a single bilayer encapsulating an aqueous core; SUVs typically have a diameter≤50 nm, and LUVs have a diameter>50 nm. Liposomes herein are ideally LUVs with a diameter in the range of 60-180 nm, and preferably in the range of 80-160 nm. For a composition comprising a population of LUVs with different diameters: (i) at least 80% by number should have diameters in the range of 20-220 nm, (ii) the average diameter (Zav, by intensity) of the population is ideally less than 140 nm, and/or (iii) a polydispersity index<0.3. If the liposomes herein are not spherical, the term "diameter" refers to a liposome's largest cross-sectional diameter.

Liposomes useful for encapsulating RNA can be formed from a single lipid or from a mixture of lipids, provided that at least one of the lipids has a pKa in the range of 5.0 to 7.6 (and, preferably, a tertiary amine). Within this pKa range, preferred lipids have a pKa of 5.5 to 6. The pKa is the pH at which 50% of the lipids are charged, lying halfway between the point where the lipids are completely charged and the point where the lipids are completely uncharged. It can be measured in various ways, but is preferably measured using the method disclosed below in the section entitled "pKa measurement". The pKa typically should be measured for the lipid alone rather than for the lipid in the context of a mixture which also includes other lipids.

Where a liposome herein is formed from a mixture of lipids, it is preferred that the proportion of those lipids which have a pKa within the desired range should be between 20-80% of the total amount of lipids e.g. between 30-70%, or between 40-60%. The remainder can be made of e.g. cholesterol (e.g. 35-55% cholesterol); and/or DMG (optionally PEGylated) or DMG PE; and/or DSPC. Such mixtures are used below. These % values are mole percentages.

As mentioned above, a liposome may include an amphiphilic lipid whose hydrophilic portion is PEGylated (i.e. modified by covalent attachment of a polyethylene glycol). This modification can increase stability and prevent non-specific adsorption of the liposomes. For instance, lipids can be conjugated to PEG using techniques known in the art. PEG provides the liposomes with a coat which can confer favourable pharmacokinetic characteristics. The combination of efficient encapsulation of a RNA (particularly a self-replicating RNA), a cationic lipid having a pKa in the range 5.0-7.6, and a PEGylated surface, allows for efficient delivery to multiple cell types (including both immune and non-immune cells), thereby eliciting a stronger and better immune response than when using quaternary amines without PEGylation. Various lengths of PEG can be used e.g. between 0.5-8 kDa, including, for example, a PEG2K (PEG2000), i.e., a PEG molecule of roughly 2 kDaltons.

Lipids used with the invention can be saturated or unsaturated. The use of at least one unsaturated lipid for preparing liposomes is preferred. If an unsaturated lipid has two tails, both tails can be unsaturated or it can have one saturated tail and one unsaturated tail.

In some embodiments, the liposomes will comprise a cationic lipid that comprises a headgroup with a tertiary amine (an ionizable cationic lipid). In some embodiments, the cationic lipids herein further comprises at least one hindered ester group; at least one carbonate group; or at least one aromatic group in the core. In some embodiments, the cationic lipid further comprises an unhindered ester group.

Applicants have observed that the biological activity of RNA encapsulated in liposomes comprising certain ionizable cationic lipids is several-fold higher than the same RNA encapsulated in liposomes comprising other ionizable cationic lipids. Thus, the selection of ionizable cationic lipid is an important parameter for generating RNA encapsulated liposomes having satisfactory biological activity. The activity of RNA encapsulated in liposomes can be measured by determining antigen expression in vitro using high content imaging as described in detail elsewhere herein. In brief, regression of the percentage of antigen expressing cells as a function of RNA concentration is carried out to produce an $EC_{50}$ value, the concentration of RNA that produces half-maximal response. In some embodiments, the ionizable cationic lipids suitable for use herein will produce a liposome encapsulated RNA having an $EC_{50}$ of less than 2.5 ng/well, such as less than 2.4 ng/well, less than 2.3 ng/well, less than 2.2 ng/well, less than 2.1 ng/well, less than 2.0 ng/well, less than 1.9 ng/well, less than 1.8 ng/well, less than 1.7 ng/well, less than 1.6 ng/well, less than 1.5 ng/well, less than 1.4 ng/well, less than 1.3 ng/well, less than 1.2 ng/well, less than 1.1 ng/well, less than 1.0 ng/well, less than 0.9 ng/well, less than 0.8 ng/well, less than 0.7 ng/well, less than 0.6 ng/well, less than 0.5 ng/well, less than 0.4 ng/well, less than 0.3 ng/well, less than 0.25 ng/well, less than 0.20 ng/well, less than 0.15 ng/well, or less than 0.10 ng/well.

In some embodiments, the cationic lipids herein comprise the structure of Formula I:

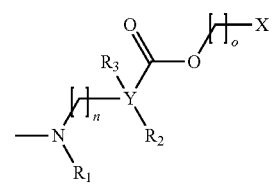

Formula I wherein n=an integer from 1 to 3 and
  (i) $R_1$ is $CH_3$, $R_2$ and $R_3$ are both H, and Y is C; or
  (ii) $R_1$ and $R_2$ are collectively $CH_2$—$CH_2$ and together with the nitrogen form a five-, six-, or seven-membered heterocycloalkyl, $R_3$ is $CH_3$, and Y is C; or
  (iii) $R_1$ is $CH_3$, $R_2$ and $R_3$ are both absent, and Y is O;
wherein o is 0 or 1;
wherein X is:
  (i)

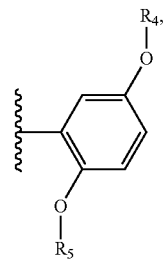

wherein $R_4$ and $R_5$ are independently a $C_{10-20}$ hydrocarbon chain having one or two cis alkene groups at either or both of the omega 6 and 9 positions; or
  (ii) —CH(—$R_6$)—$R_7$, wherein
    (1) $R_6$ is —$(CH_2)_p$—O—C(O)—$R_8$ or —$C_p$—$R_8$;
    (2) $R_7$ is —$(CH_2)_{p'}$—O—C(O)—$R_8'$ or —$C_{p'}$—$R_8'$,
    (3) p and p' are independently 0, 1, 2, 3 or 4; and
    (4) $R_8$ and $R_{8'}$ are independently a
      (A) —$C_{8-20}$ hydrocarbon chain having one or two cis alkene groups at either or both of the omega 6 and 9 positions;

(B) —C$_{1-3}$—C(—O—C$_{6-12}$)—O—C$_{6-12}$ saturated or unsaturated hydrocarbon chain;
(C) —C$_{6-16}$ saturated hydrocarbon chain;
(D) —C(—C$_{6-16}$)—C$_{6-16}$ saturated or unsaturated hydrocarbon chain;
(E) —C[—C—O—C(O)—C$_{4-12}$]C—O—C(O)—C$_{4-12}$ saturated or unsaturated hydrocarbon chain; and
(F) —C$_{6-16}$ saturated or unsaturated hydrocarbon chain.

In some embodiments, $R_1$ is $CH_3$, $R_2$ and $R_3$ are both H, and Y is C. In some embodiments, $R_1$ and $R_2$ are collectively $CH_2$—$CH_2$ and together with the nitrogen form a five-, six-, or seven-membered heterocycloalkyl, $R_3$ is $CH_3$, and Y is C. In some embodiments, $R_1$ is $CH_3$, $R_2$ and R3 are both absent, and Y is O.

In some embodiments, X is

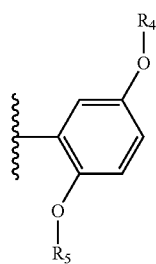

wherein $R_4$ and $R_5$ are independently a $C_{10-20}$ hydrocarbon chain having one or two cis alkene groups at either or both of the omega 6 and 9 positions.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C$_{8-20}$ hydrocarbon chain having one or two cis alkene groups at either or both of the omega 6 and 9 positions.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C$_{1-3}$—C(—O—C$_{6-12}$)—O—C$_{6-12}$ saturated or unsaturated hydrocarbon chain.

In some embodiments, X is —CH(—R$_6$)-R$_7$, R$_6$ is -(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C$_{6-16}$ saturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C(—C$_{6-16}$)—C$_{6-16}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C$_{6-16}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{1-3}$—C(—O—C$_{6-12}$)—O—C$_{6-12}$ saturated or unsaturated hydrocarbon chain; and R$_8$' is a —C$_{8-20}$ hydrocarbon chain having one or two cis alkene groups at either or both of the omega 6 and 9 positions.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{1-3}$—C(—O—C$_{6-12}$)—O—C$_{6-12}$ saturated or unsaturated hydrocarbon chain; and R$_8$' is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{1-3}$—C(—O—C$_{6-12}$)—O—C$_{6-12}$ saturated or unsaturated hydrocarbon chain; and R$_8$' is a —C$_{6-16}$ saturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{1-3}$—C(—O—C$_{6-12}$)—O—C$_{6-12}$ saturated or unsaturated hydrocarbon chain; and R$_8$' is a —C(—C$_{6-16}$)—C$_{6-16}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{1-3}$—C(—O—C$_{6-12}$)—O—C$_{6-12}$ saturated or unsaturated hydrocarbon chain; and R$_8$' is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{1-3}$—C(—O—C$_{6-12}$)—O—C$_{6-12}$ saturated or unsaturated hydrocarbon chain; and R$_8$' is a —C$_{6-16}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{6-16}$ saturated hydrocarbon chain; and R$_8$' is a —C$_{8-20}$ hydrocarbon chain having one or two cis alkene groups at either or both of the omega 6 and 9 positions.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{6-16}$ saturated hydrocarbon chain; and R$_8$' is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{6-16}$ saturated hydrocarbon chain; and R$_8$' is a —C$_{6-16}$ saturated hydrocarbon chain.

In some embodiments, X is —CH(—R$_6$)—R$_7$, R$_6$ is —(CH$_2$)$_p$—O—C(O)—R$_8$, R$_7$ is —(CH$_2$)$_{p'}$—O—C(O)—R$_8$', p and p' are independently 0, 1, 2, 3 or 4; R$_8$ is a —C$_{6-16}$ saturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C_{6-16}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C_{6-16}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C_{6-16}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C_{6-16}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C_{6-16}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-(CH_2)_{p'}-O-C(O)-R_8'$, p and p' are independently 0, 1, 2, 3 or 4; and $R_8$ is a $-C_{6-16}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is $-C_{1-3}-C(-O-C_{6-12})-O-C_{6-12}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{6-16}$ saturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{6-16}$ saturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{6-16}$ saturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{6-16}$ saturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{6-16}$ saturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; $R_8$ is a $-C_{6-16}$ saturated hydrocarbon chain; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C_{6-16}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-(CH_2)_p-O-C(O)-R_8$, $R_7$ is $C_{p'}-R_8'$, p and p' are independently 0, 1, 2, 3 or 4; and $R_8$ is a $-C_{6-16}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C_{6-16}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C_{6-16}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C_{6-16}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-(CH_2)_p-O-C(O)-R_8$, $R_7$ is $-C_{p'}-R_8'$, p and p' are independently 0, 1, 2, 3 or 4; and $R_8$ is a $-C_{6-16}$ saturated or unsaturated hydrocarbon chain; and $R_8'$ is a $-C_{6-16}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{6-16}$ saturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C(-C_{6-16})-C_{6-16}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{6-16}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is $-C_{1-3}-C(-O-C_{6-12})-O-C_{6-12}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —$C_{6-16}$ saturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —$C_{6-16}$ saturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —(CH$_2$)$_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is —$C_{1-3}$—C(—O—$C_{6-12}$)—O—$C_{6-12}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C(—C$_{6-16}$)—C$_{6-16}$ saturated or unsaturated hydrocarbon chain; and R$_8'$ is a —C$_{6-16}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8'$ is a —C$_{8-20}$ hydrocarbon chain having one or two cis alkene groups at either or both of the omega 6 and 9 positions.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8'$ is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8'$ is a —C$_{6-16}$ saturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8'$ is a —C(—C$_{6-16}$)—C$_{6-16}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8'$ is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8'$ is a —C$_{6-16}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C$_{6-16}$ saturated or unsaturated hydrocarbon chain; and R$_8'$ is a —C$_{8-20}$ hydrocarbon chain having one or two cis alkene groups at either or both of the omega 6 and 9 positions.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C$_{6-16}$ saturated or unsaturated hydrocarbon chain; and R$_8'$ is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C$_{6-16}$ saturated or unsaturated hydrocarbon chain; and R$_8'$ is a —C$_{6-16}$ saturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C$_{6-16}$ saturated or unsaturated hydrocarbon chain; and R$_8'$ is a —C(—C$_{6-16}$)—C$_{6-16}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8''$, p and p' are independently 0, 1, 2, 3 or 4; and R$_8$ is a —C$_{6-16}$ saturated or unsaturated hydrocarbon chain; and R$_8'$ is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —C$_p$—R$_8$, R$_7$ is —C$_{p'}$—R$_8'$, p and p' are independently 0, 1, 2, 3 or 4; and R$_8$ is a —C$_{6-16}$ saturated or unsaturated hydrocarbon chain; and R$_8'$ is a —C$_{6-16}$ saturated or unsaturated hydrocarbon chain.

In some embodiments, an exemplary cationic lipid is RV28 having the following structure:

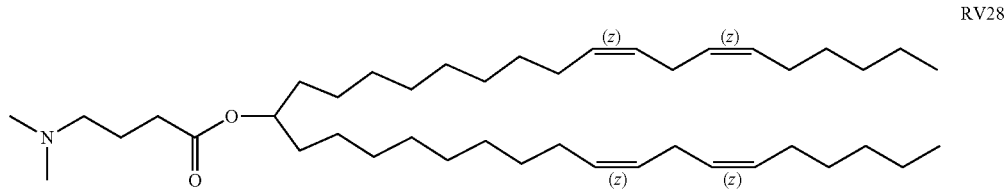 [SMILES: CCCCC/C=C\C/C=C\CCCCCCCCC(CCCCCCCC/C=C\C/C=C\CCCCC)OC(=O)CCCN(C)C]

RV28

In some embodiments, an exemplary cationic lipid is RV31 having the following structure:

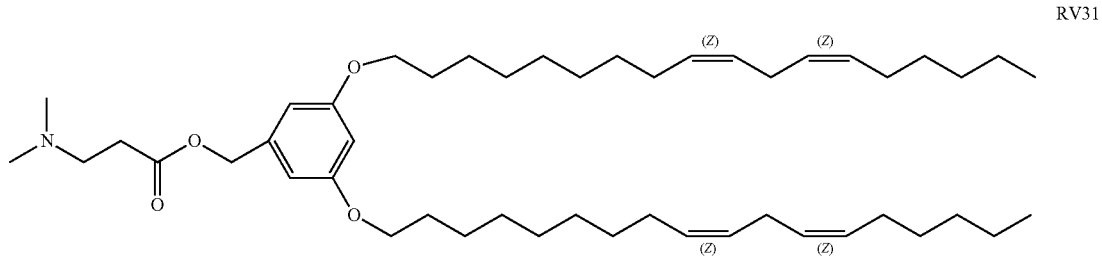 [SMILES: CCCCC/C=C\C/C=C\CCCCCCCCOc1cc(COC(=O)CCN(C)C)cc(OCCCCCCCC/C=C\C/C=C\CCCCC)c1]

RV31

In some embodiments, an exemplary cationic lipid is RV33 having the following structure:
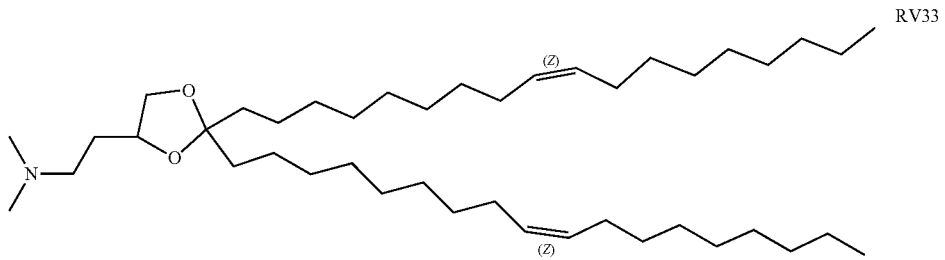 [SMILES: CCCCCCCC/C=C\CCCCCCCCC1(CCCCCCCC/C=C\CCCCCCCC)OCC(CCN(C)C)O1]
In some embodiments, an exemplary cationic lipid is RV37 having the following structure:
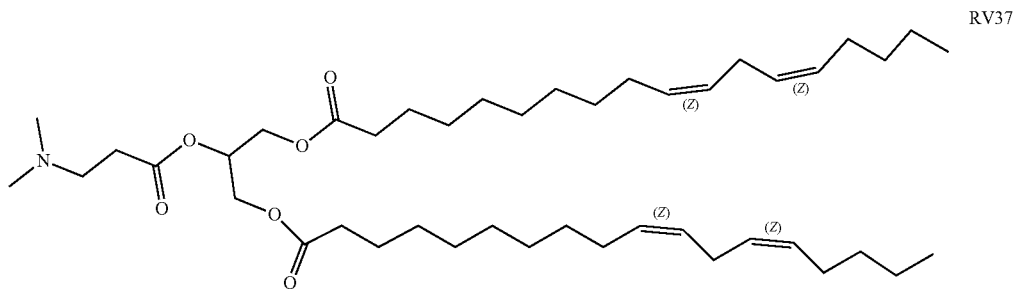 [SMILES: CCCC/C=C\C/C=C\CCCCCCCCC(=O)OCC(COC(=O)CCCCCCCC/C=C\C/C=C\CCCC)OC(=O)CCN(C)C]
In some embodiments, an exemplary cationic lipid is RV39 having the following structure:
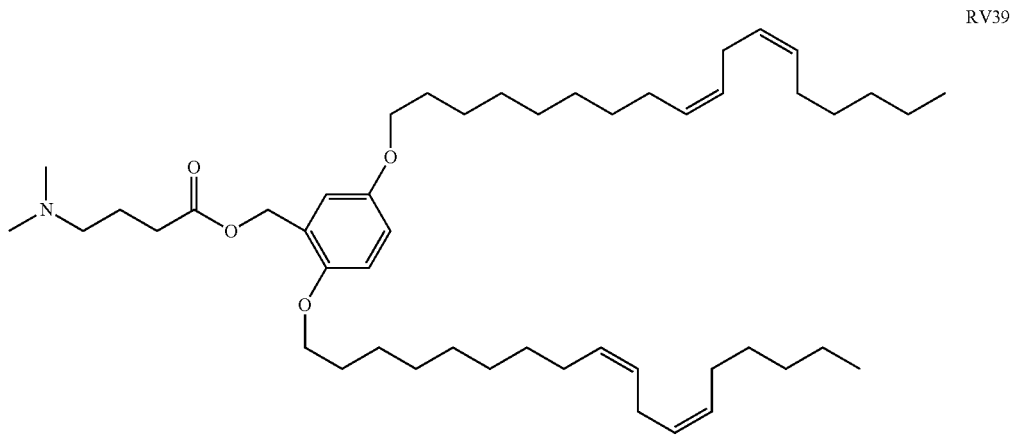 [SMILES: CCCCC/C=C\C/C=C\CCCCCCCCOc1ccc(OCCCCCCCC/C=C\C/C=C\CCCCC)c(COC(=O)CCCN(C)C)c1]
In some embodiments, an exemplary cationic lipid is RV42 having the following structure:
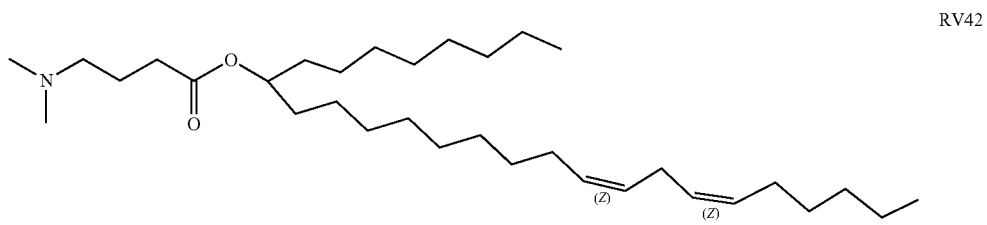

In some embodiments, an exemplary cationic lipid is RV44 having the following structure:
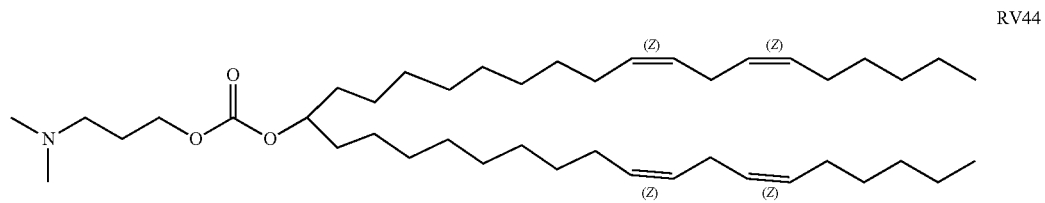 [SMILES: CCCCC/C=C\C/C=C\CCCCCCCCC(CCCCCCCC/C=C\C/C=C\CCCCC)OC(=O)OCCCN(C)C]
RV44
In some embodiments, an exemplary cationic lipid is RV73 having the following structure:
In some embodiments, an exemplary cationic lipid is RV75 having the following structure:
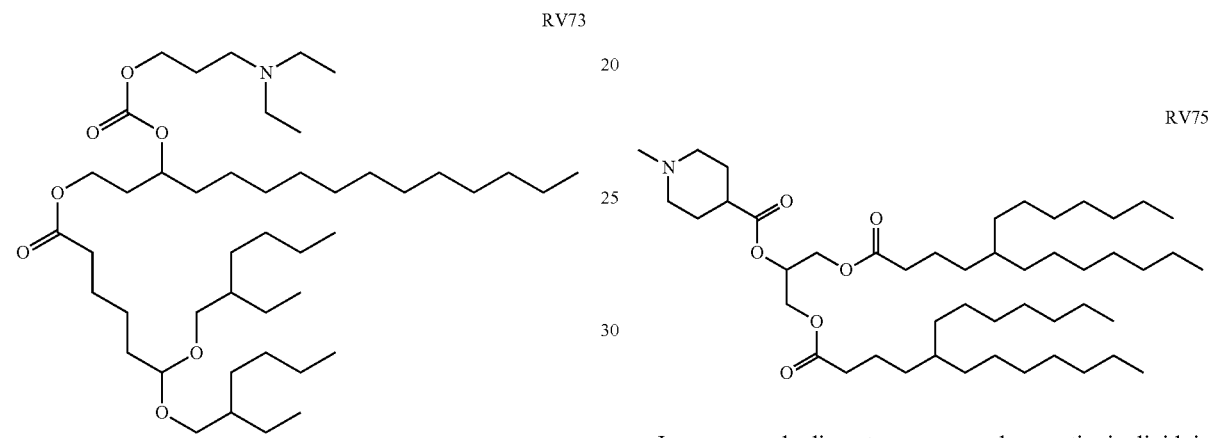
In some embodiments, an exemplary cationic lipid is RV81 having the following structure:
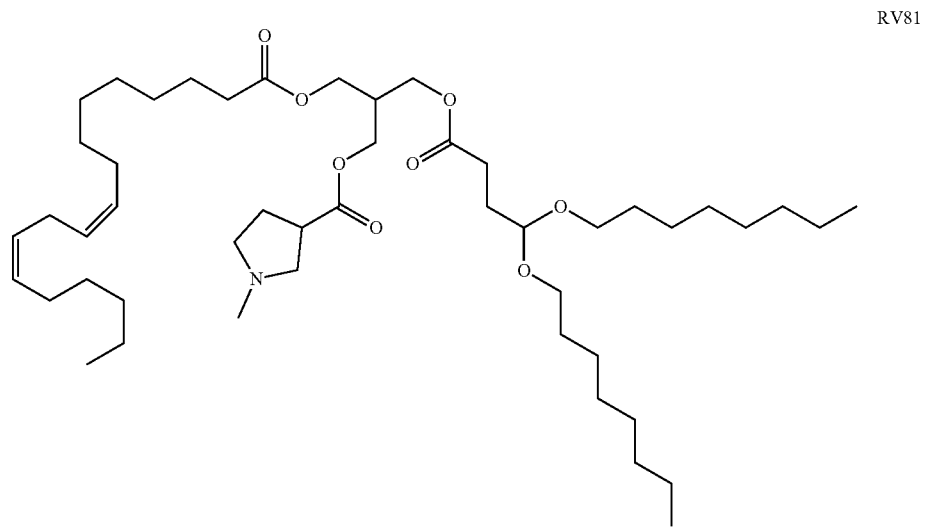 [SMILES: CCCCC/C=C\C/C=C\CCCCCCCC(=O)OCC(COC(=O)CCC(OCCCCCCCC)OCCCCCCCC)COC(=O)C1CCN(C)C1]

In some embodiments, an exemplary cationic lipid is RV84 having the following structure:
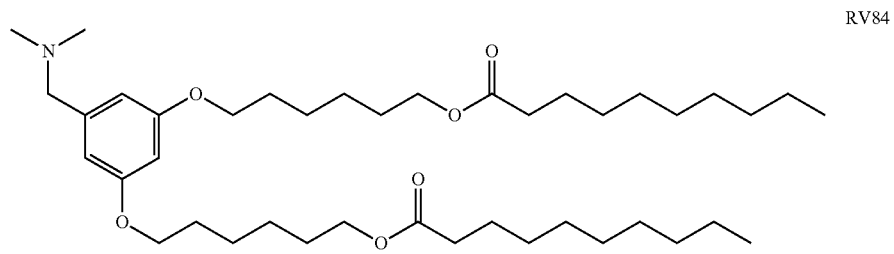 [SMILES: CCCCCCCCCC(=O)OCCCCCCOc1cc(CN(C)C)cc(OCCCCCCOC(=O)CCCCCCCCC)c1]
RV84
In some embodiments, an exemplary cationic lipid is RV85 having the following structure:
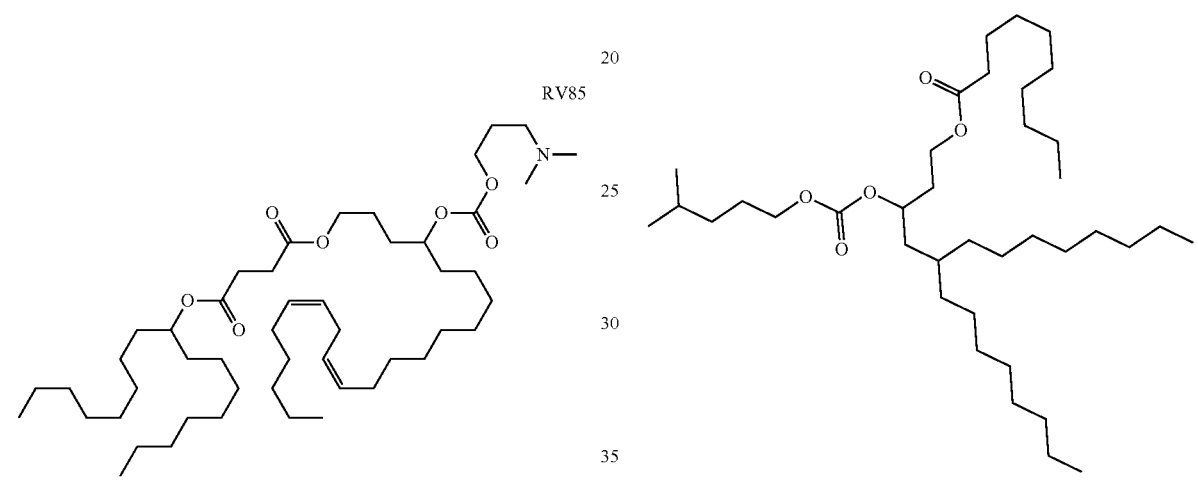
RV85
RV86
In some embodiments, an exemplary cationic lipid is RV86 having the following structure:
In some embodiments, an exemplary cationic lipid is RV88 having the following structure:
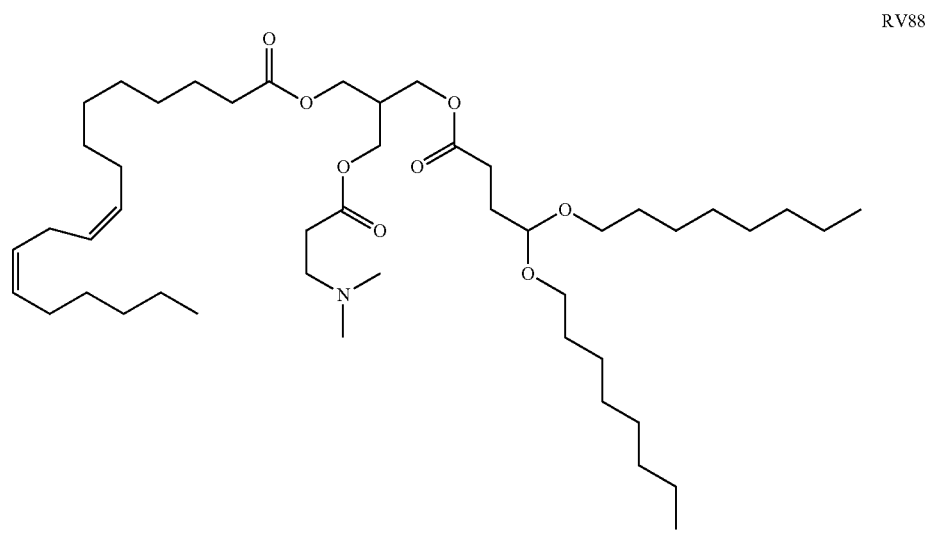 [SMILES: CCCCC/C=C\C/C=C\CCCCCCCC(=O)OCC(COC(=O)CCC(OCCCCCCCC)OCCCCCCCC)COC(=O)CCN(C)C]
RV88

In some embodiments, an exemplary cationic lipid is RV91 having the following structure:
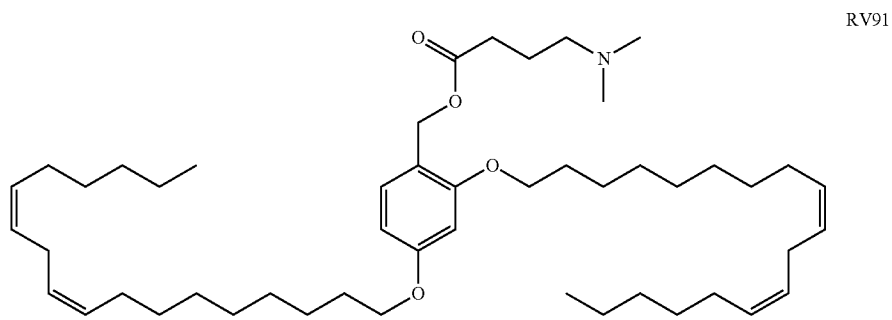 [SMILES: CCCCC/C=C\C/C=C\CCCCCCCCOc1ccc(COC(=O)CCCN(C)C)c(OCCCCCCCC/C=C\C/C=C\CCCCC)c1]
RV91
In some embodiments, an exemplary cationic lipid is RV92 having the following structure:
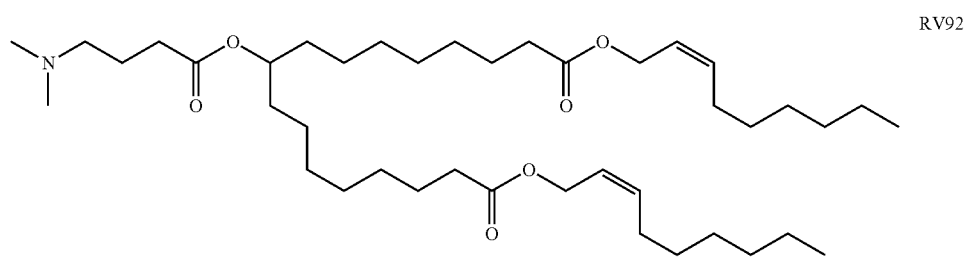 [SMILES: CCCCCC/C=C\COC(=O)CCCCCCCC(CCCCCCCC(=O)OC/C=C\CCCCCC)OC(=O)CCCN(C)C]
RV92
In some embodiments, an exemplary cationic lipid is RV93 having the following structure:
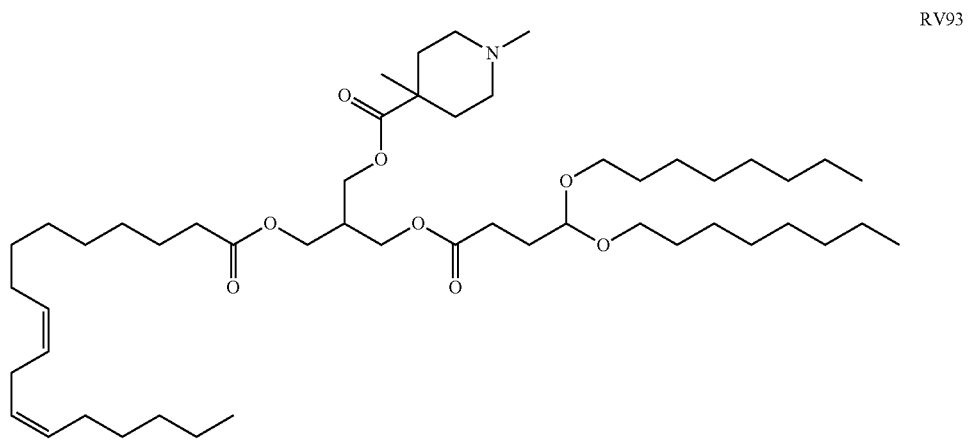 [SMILES: CCCCC/C=C\C/C=C\CCCCCCCC(=O)OCC(COC(=O)CCC(OCCCCCCCC)OCCCCCCCC)COC(=O)C1(C)CCN(C)CC1]
RV93

In some embodiments, an exemplary cationic lipid is RV94 having the following structure:
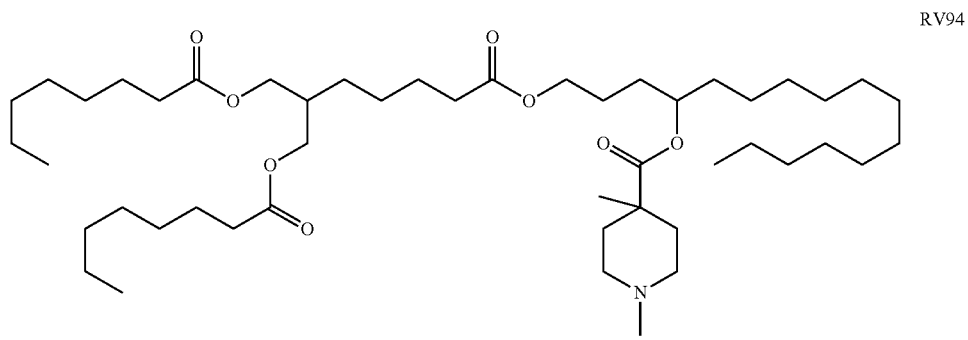 [SMILES: CCCCCCCCCCCCC(CCCOC(=O)CCCCC(COC(=O)CCCCCCC)COC(=O)CCCCCCC)OC(=O)C1(C)CCN(C)CC1]
RV94
In some embodiments, an exemplary cationic lipid is RV95 having the following structure:
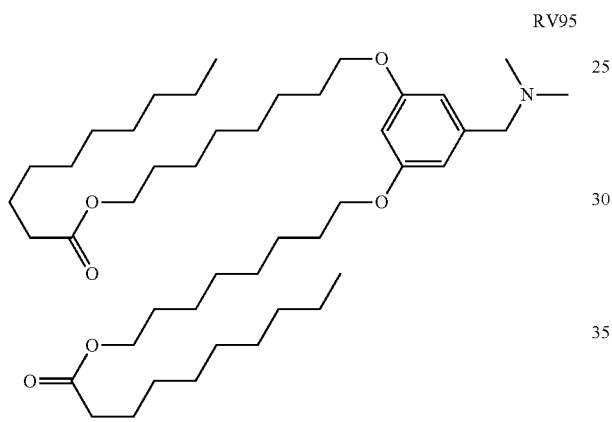
RV95
In some embodiments, an exemplary cationic lipid is RV96 having the following structure:
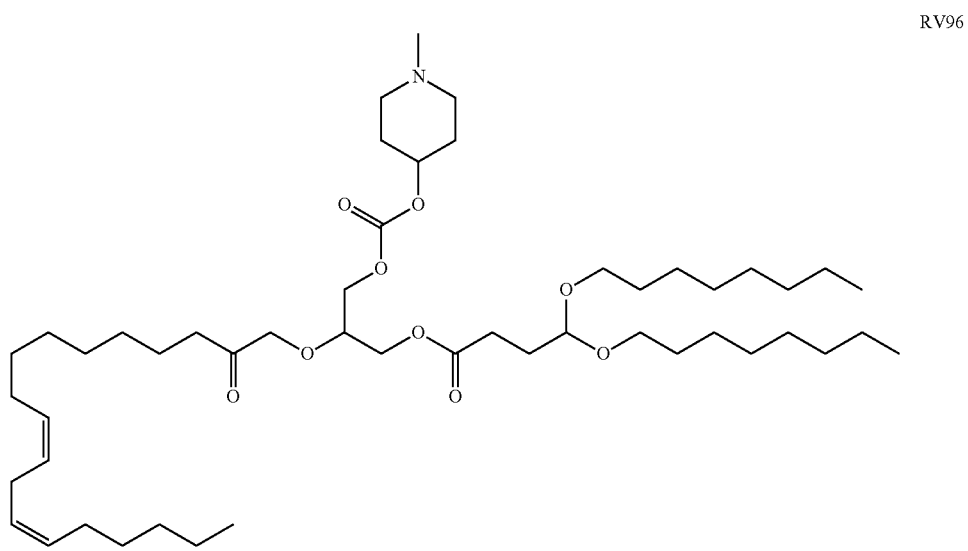 [SMILES: CCCCC/C=C\C/C=C\CCCCCCCC(=O)COC(COC(=O)CCC(OCCCCCCCC)OCCCCCCCC)COC(=O)OC1CCN(C)CC1]
RV96

In some embodiments, an exemplary cationic lipid is RV97 having the following structure:
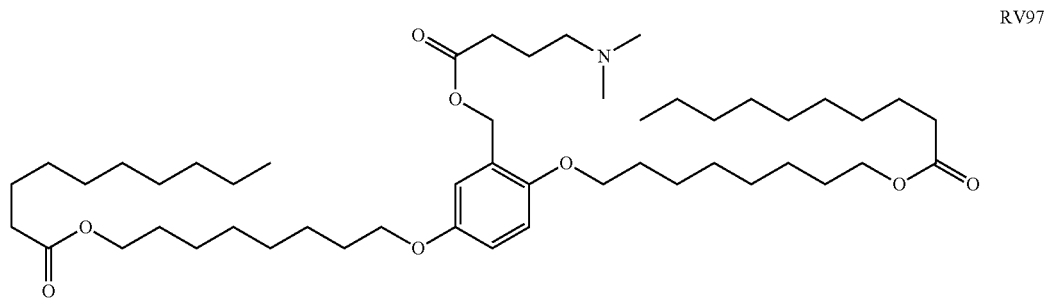 [SMILES: CCCCCCCCCC(=O)OCCCCCCCCOc1ccc(OCCCCCCCCOC(=O)CCCCCCCCC)c(COC(=O)CCCN(C)C)c1]
In some embodiments, an exemplary cationic lipid is RV99 having the following structure:
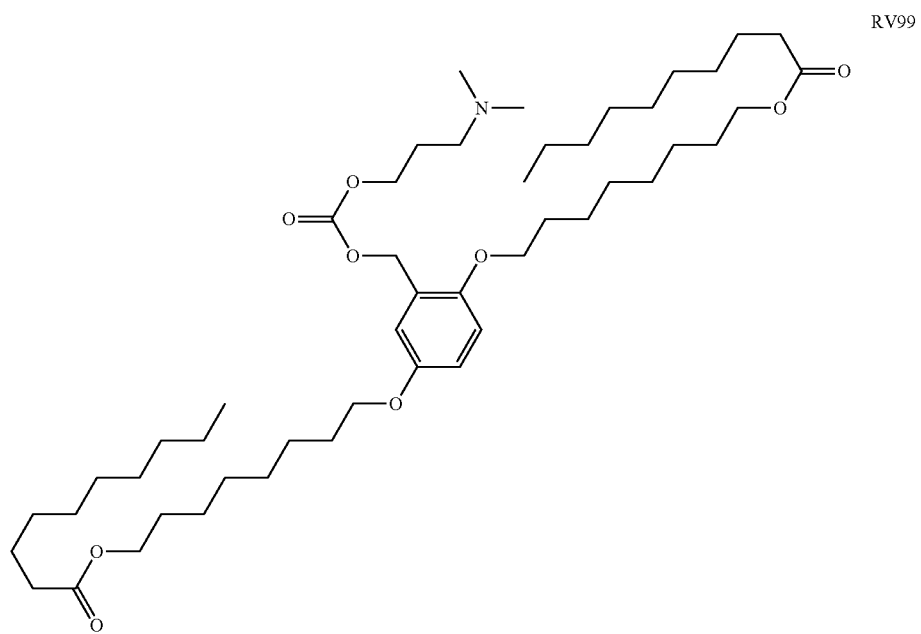 [SMILES: CCCCCCCCCC(=O)OCCCCCCCCOc1ccc(OCCCCCCCCOC(=O)CCCCCCCCC)c(COC(=O)OCCCN(C)C)c1]

In some embodiments, an exemplary cationic lipid is RV101 having the following structure:

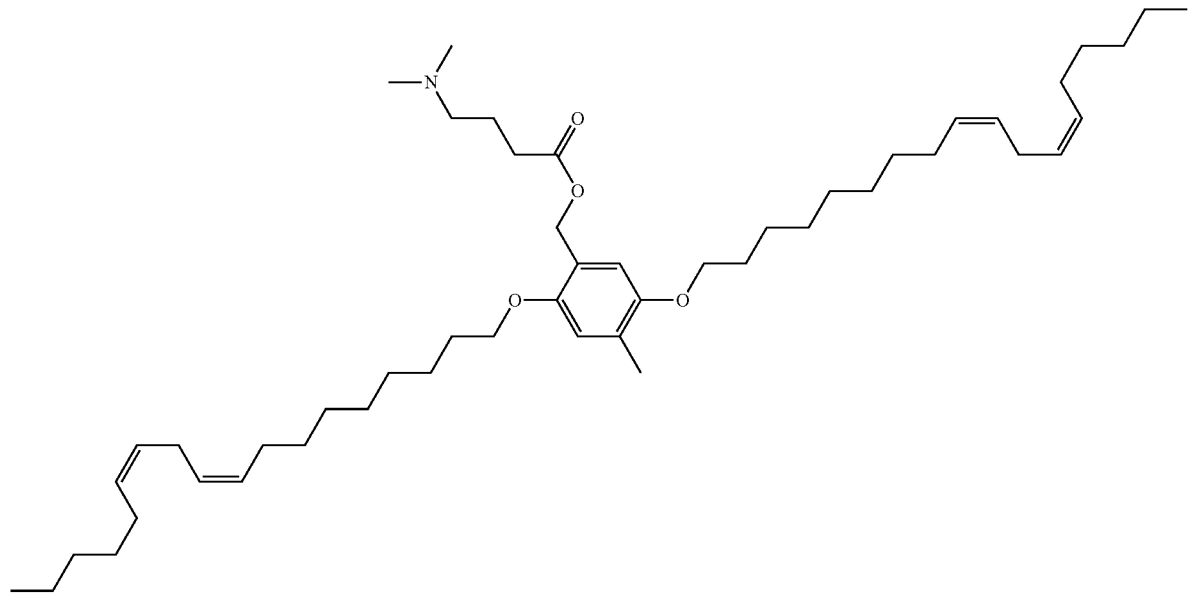

RV101

In some embodiments, the cationic lipid is selected from the group consisting of: RV39, RV88, and RV94.

Compositions and methods for the synthesis of compounds having Formula I and RV28, RV31, RV33, RV37, RV39, RV42, RV44, RV73, RV75, RV81, RV84, RV85, RV86, RV88, RV91, RV92, RV93, RV94, RV95, RV96, RV97, RV99, and RV101 can be found in PCT/US2014/070882 (publication number WO/2015/095340) and PCT/US2014/070891 (publication number WO/2015/095346), filed 17 Dec. 2014; as well as PCT/US2015/048535 (publication number WO/2016/037053), filed 4 Sep. 2015.

The liposomes will typically further comprise helper lipids. Useful helper lipids include zwitterionic lipids, such as DPPC, DOPC, DSPC, dodecylphosphocholine, 1,2-dioleoyl-sn-glycero-3-phosphatidylethanolamine (DOPE), and 1,2-diphytanoyl-sn-glycero-3-phosphoethanolamine (DPyPE); sterols, such as cholesterol; and PEGylated lipids, such as PEG-DMPE (PEG-conjugated 1, 2-dimyristoyl-Sn-glycero-3-phosphoethanolamine-N-[methoxy (polyethylene glycol)]) or PEG-DMG (PEG-conjugated 1,2-Dimyristoyl-sn-glycerol, methoxypolyethylene Glycol). In some embodiments, useful PEGylated lipids may be PEG2K-DMPE (PEG-conjugated 1, 2-dimyristoyl-Sn-glycero-3-phosphoethanolamine-N-[methoxy (polyethylene glycol)-2000]) or PEG2K-DMG (PEG-conjugated 1,2-Dimyristoyl-sn-glycerol, methoxypolyethylene Glycol-2000).

In some embodiments, the methods herein utilize lipids comprising (i) an ionizable cationic lipid having a pKa in the range of 5.0-7.6, (ii) DSPC, (iii) a sterol, and (iv) a PEGylated lipid. In some embodiments, the methods herein utilize lipids consisting essentially of (i) an ionizable cationic lipid having a pKa in the range of 5.0-7.6, (ii) DSPC, (iii) a sterol, and (iv) a PEGylated lipid. In some embodiments, the PEGylated lipid is selected from PEG-PE and PEG-DMG. In some embodiments, the lipids comprise (i) a cationic lipid having Formula I, (ii) DSPC, (ii) a sterol, and (iv) a PEGylated lipid selected from PEG-PE and PEG-DMG. In some embodiments, the lipids consist essentially of (i) a cationic lipid having Formula I, (ii) DSPC, (ii) a sterol, and (iv) a PEGylated lipid selected from PEG-PE and PEG-DMG. In some embodiments, the ionizable cationic lipid has a pKa in the range of 5.5-6.7, 5.7-6.6, 5.9-6.5, 6.0-6.4. In some embodiments, the lipids comprise (i) an ionizable cationic lipid wherein the cationic lipid comprises at least one hindered ester group; at least one carbonate group; or at least one aromatic group in the core, (ii) DSPC, (iii) a sterol, and (iv) a PEG selected from PEG-PE and PEG-DMG. In some embodiments, the lipids consist essentially of (i) an ionizable cationic lipid wherein the cationic lipid comprises at least one hindered ester group; at least one carbonate group; or at least one aromatic group in the core, (ii) DSPC, (iii) a sterol, and (iv) a PEG selected from PEG-PE and PEG-DMG. In some embodiments, the sterol is cholesterol. In some embodiments, the lipids comprise a cationic lipid having Formula I, DSPC, cholesterol, and PEG-DMG. In some embodiments, the lipids comprise a cationic lipid selected from the group consisting of: RV39, RV88, and RV94, DSPC, cholesterol, and PEG-DMG.

The lipids utilized in the methods herein may be prepared by solubilizing individual lipids in solvent and combining the appropriate amount to produce a stock solution of total lipids comprising the calculated percent, ratio, or weight of each lipid. Alternatively, the lipids utilized in the methods herein may be prepared by combining the appropriate amount of each lipid and then solubilizing them in solvent.

In some embodiments of the methods disclosed herein between 20-80%, 30-70%, or 40-60% (mole percent) of total lipids in the solution comprising solvent are cationic. In some embodiments, about 35%, about 40%, about 45%, about 50%, about 55% (mole percent) of total lipids in the solution comprising solvent are cationic.

In some embodiments of the methods disclosed herein between 35-55% or between 40-50% (mole percent) of total lipids in the solution comprising solvent are cholesterol. In some embodiments, about 45%, about 46%, about 47%, about 48%, about 49%, about 50% (mole percent) of total lipids in the solution comprising solvent are cholesterol.

In some embodiments of the methods disclosed herein between 0.5-5% or between 1.0-3.0% (mole percent) of total lipids in the solution comprising solvent are a PEGylated lipid selected PEG-PE and PEG-DMG. In some embodiments, about 1.5%, about 1.6%, about 1.7%, about 1.8%, about 1.9%, about 2.0%, about 2.5% (mole percent) of total lipids in the solution comprising solvent are a PEGylated lipid selected PEG-PE and PEG-DMG.

In some embodiments of the methods disclosed herein between 5-15% or between 7.5-13% (mole percent) of total lipids in the solution comprising solvent are DSPC. In some embodiments, about 8%, about 9%, about 10%, about 11%, about 12% (mole percent) of total lipids in the solution comprising solvent are DSPC.

In some embodiments, the ratio of cationic lipid:(cholesterol+PEGylated lipid+DSPC) (mole:mole) is between 1:5 and 4:5; between 3:10 and 7:10; between 2:5 and 3:5. In some embodiments, the ratio of cholesterol:(cationic lipid+PEGylated lipid+DSPC) (mole:mole) is between 7:20 and 11:20; or between 2:5 and 1:2. In some embodiments, the ratio of PEGylated lipid:(cationic lipid+cholesterol+DSPC) (mole:mole) is between 1:200 and 1:20; or between 1:100 and 3:100. In some embodiments, the ratio of DSPC:(cationic lipid+cholesterol+PEGylated lipid) (mole:mole) is between 1:20 and 3:20; or between 15:200 and 13:100.

The stock solution of lipids plus solvent for use herein is prepared at a convenient concentration of lipids. Advantageously, by increasing the stock solution concentration one may work at a lower volume before nanoprecipitation and the final product can be more concentrated. In some embodiments, the solution comprising solvent further comprises at least 1 mg/mL; at least 2 mg/mL; at least 3 mg/mL; at least 4 mg/mL; at least 5 mg/mL; at least 6 mg/mL; at least 7 mg/mL; at least 8 mg/mL; at least 9 mg/mL; at least 10 mg/mL; at least 15 mg/mL; at least 20 mg/mL of total lipid. In some embodiments, wherein the solution comprising solvent further comprises between 1-20 mg/mL; 1-15 mg/mL; 1-10 mg/mL of total lipid, but no more than 50 mg/mL of total lipid.

The solvent utilized in the solution of lipids is compatible with lipids and miscible with the aqueous solution. In some embodiments, the solvent in the solution of lipids may be a Class 3 solvent, including acetic acid, heptane, acetone, isobutyl acetate, anisole, isopropyl acetate, 1-butanol, methyl acetate, 2-butanol, 3-methyl-1-butanol, butyl acetate, methylethyl ketone, tert-butylmethyl ether, 2-methyl-1-propanol, dimethyl sulfoxide, pentane, ethanol, 1-pentanol, ethyl acetate, 1-propanol, ethyl ether, 2-propanol, ethyl formate, propyl acetate, formic acid, and triethylamine. In some embodiments, the solvent in the solution of lipids may be an organic alcohol. In some embodiments, the solvent comprises between 70-100% ethanol. In some embodiments, the solvent is at least 80%, at least 90%, at least 95%, at least 98%, at least 99% organic alcohol. In some embodiments, the solvent is less than 10%, less than 5%, less than 4%, less than 3%, less than 2%, less than 1%, less than 0.5% water. In some embodiments, the solvent in the solution of lipids is selected from the group consisting of isopropanol and ethanol. In some embodiments, the solvent comprises between 70-100% ethanol. In some embodiments, the solvent is at least 80%, at least 90%, at least 95%, at least 98%, at least 99% ethanol. In some embodiments, the ethanol is less than 10%, less than 5%, less than 4%, less than 3%, less than 2%, less than 1%, less than 0.5% water. In some embodiments, the solvent is 100% ethanol.

The RNA

The invention is useful for in vivo delivery of RNA which encodes an immunogen. The RNA is translated by non-immune cells at the delivery site, leading to expression of the immunogen. The non-immune cells may also secrete type I interferons and/or pro-inflammatory cytokines in response to the RNA, as may immune cells when present, which may provide a local adjuvant effect.

The RNA is +-stranded, and so it can be translated by the non-immune cells without needing any intervening replication steps such as reverse transcription. It can also bind to TLR 7 receptors expressed by immune cells, thereby initiating an adjuvant effect.

Preferred +-stranded RNAs are self-replicating. A self-replicating RNA molecule (replicon) can, when delivered to a vertebrate cell even without any proteins, lead to the production of multiple daughter RNAs by transcription from itself (via an antisense copy which it generates from itself). A self-replicating RNA molecule is thus typically a +-strand molecule which can be directly translated after delivery to a cell, and this translation provides a RNA-dependent RNA polymerase which then produces both antisense and sense transcripts from the delivered RNA. Thus the delivered RNA leads to the production of multiple daughter RNAs. These daughter RNAs, as well as collinear sub genomic transcripts, may be translated themselves to provide in situ expression of an encoded immunogen, or may be transcribed to provide further transcripts with the same sense as the delivered RNA which are translated to provide in situ expression of the immunogen. The overall results of this sequence of transcriptions is a huge amplification in the number of the introduced replicon RNAs and so the encoded immunogen becomes a major polypeptide product of the cells.

As shown below, a self-replicating activity is not required for a RNA to provide an adjuvant effect, although it can enhance post-transfection secretion of cytokines. The self-replicating activity is particularly useful for achieving high level expression of the immunogen by non-immune cells. It can also enhance apoptosis of the non-immune cells.

One suitable system for achieving self-replication is to use an alphavirus-based RNA replicon. These +-stranded replicons are translated after delivery to a cell to give of a replicase (or replicase-transcriptase). The replicase is translated as a polyprotein which auto-cleaves to provide a replication complex which creates genomic −/−strand copies of the +/−strand delivered RNA. These −/−strand transcripts can themselves be transcribed to give further copies of the +/−stranded parent RNA and also to give a sub genomic transcript which encodes the immunogen. Translation of the sub genomic transcript thus leads to in situ expression of the immunogen by the infected cell. Suitable alphavirus replicons can use a replicase from a sindbis virus, a semliki forest virus, an eastern equine encephalitis virus, a venezuelan equine encephalitis virus, etc. Mutant or wild-type virus sequences can be used e.g. the attenuated TC83 mutant of VEEV has been used in replicons.

A preferred self-replicating RNA molecule thus encodes (i) a RNA-dependent RNA polymerase which can transcribe RNA from the self-replicating RNA molecule and (ii) an immunogen. The polymerase can be an alphavirus replicase e.g. comprising one or more of alphavirus proteins nsP 1, nsP2, nsP3 and nsP4.

Whereas natural genomes of self-replicating RNA viruses encode structural virion proteins in addition to the nonstructural replicase polyprotein, it is preferred that a self-replicating RNA molecule of the invention does not encode structural proteins. Thus a preferred self-replicating RNA can lead to the production of genomic RNA copies of itself in a cell, but not to the production of RNA containing virions. The inability to produce these virions means that, unlike a wild-type virus, such as an alphavirus, the self-replicating RNA molecule cannot perpetuate itself in infectious form. The alphavirus structural proteins which are necessary for perpetuation in wild-type viruses are absent from self-replicating RNAs of the invention and their place is taken by gene(s) encoding the immunogen of interest, such that the sub genomic transcript encodes the immunogen rather than the structural virion proteins.

Thus a self-replicating RNA molecule useful with the invention may have two open reading frames. The first (5') open reading frame encodes a replicase; the second (3') open reading frame encodes an immunogen. In some embodiments the RNA may have additional (e.g. downstream) open reading frames e.g. to encode further immunogens (see below) or to encode accessory polypeptides.

A self-replicating RNA molecule can have a 5' sequence which is compatible with the encoded replicase.

Self-replicating RNA molecules can have various lengths but they are typically 5000-25000 nucleotides long e.g. 8000-15000 nucleotides, or 9000-12000 nucleotides. Thus the RNA is longer than seen in siRNA delivery.

A RNA molecule useful with the invention may have a 5' cap (e.g. a 7-methylguanosine). This cap can enhance in vivo translation of the RNA.

The 5' nucleotide of a RNA molecule useful with the invention may have a 5' triphosphate group. In a capped RNA this may be linked to a 7-methylguanosine via a 5'-to-5' bridge. A 5' triphosphate can enhance RIG-I binding and thus promote adjuvant effects.

A RNA molecule may have a 3' poly-A tail. It may also include a poly-A polymerase recognition sequence (e.g. AAUAAA) near its 3' end.

A RNA molecule useful with the invention will typically be single-stranded. Single-stranded RNAs can generally initiate an adjuvant effect by binding to TLR7, TLR8, RNA helicases and/or PKR. RNA delivered in double-stranded form (dsRNA) can bind to TLR3, and this receptor can also be triggered by dsRNA which is formed either during replication of a single-stranded RNA or within the secondary structure of a single-stranded RNA.

A RNA molecule useful with the invention can conveniently be prepared by in vitro transcription (IVT). IVT can use a (cDNA) template created and propagated in plasmid form in bacteria, or created synthetically (for example by gene synthesis and/or polymerase chain-reaction (PCR) engineering methods). For instance, a DNA-dependent RNA polymerase (such as the bacteriophage T7, T3 or SP6 RNA polymerases) can be used to transcribe the RNA from a DNA template. Appropriate capping and poly-A addition reactions can be used as required (although the replicon's poly-A is usually encoded within the DNA template). These RNA polymerases can have stringent requirements for the transcribed 5' nucleotide(s) and in some embodiments these requirements must be matched with the requirements of the encoded replicase, to ensure that the IVT-transcribed RNA can function efficiently as a substrate for its self-encoded replicase.

The self-replicating RNA can include (in addition to any 5' cap structure) one or more nucleotides having a modified nucleobase. Thus the RNA can comprise m5C (5-methylcytidine), m5U (5-methyluridine), m6A (N6-methyladenosine), s2U (2-thiouridine), Urn(2'-0-methyluridine), m1A (1-methyladenosine); m2A (2-methyladenosine); Am (2'-0-methyladenosine); ms2m6A (2-methylthio-N6-methyladenosine); i6A (N6-isopentenyladenosine); ms2i6A (2-methylthio-N 6isopentenyladenosine); io6A (N 6-(cis-hydroxyisopentenyl)adenosine); ms2io6A (2-methylthio-N6-(cis-hydroxyisopentenyl) adenosine); g6A (N6-glycinylcarbamoyladenosine); t6A (N6-threonyl carbamoyladenosine); ms2t6A (2-methylthio-N6-threonyl carbamoyladenosine); m6t6A (N 6-methyl-N 6-threonylcarbamoyladenosine); hn6A(N 6.-30 hydroxynorvalylcarbamoyl adenosine); ms2hn6A (2-methylthio-N6-hydroxynorvalyl carbamoyladenosine); Ar(p) (2'-0-ribosyladenosine (phosphate)); I (inosine); mll (1-methylinosine); m'lm (1,2'-0-dimethylinosine); m3C (3-methylcytidine); Cm (2T-0-methylcytidine); s2C (2-thiocytidine); ac4C (N4-acetylcytidine); f5C (5-fonnylcytidine); m5Cm (5,2-0-dimethylcytidine); ac4Cm (N4acetyl2TOmethylcytidine); k2C (lysidine); mlG (1-methylguanosine); m2G (N2-methylguanosine); m7G (7-methylguanosine); Gm (2'-0-methylguanosine); m22G (N2,N2-dimethylguanosine); m2Gm (N2,2'-0-dimethylguanosine); m22Gm (N2,N2,2'-0-trimethylguanosine); Gr(p) (2'-0-ribosylguanosine (phosphate)); yW (wybutosine); o2yW (peroxywybutosine); OHyW (hydroxywybutosine); OHyW* (undermodified hydroxywybutosine); imG (wyosine); mimG (methylguanosine); Q (queuosine); oQ (epoxyqueuosine); galQ (galtactosylqueuosine); manQ (mannosyl-queuosine); preQo (7-cyano-7-deazaguanosine); preQi (7-aminomethyl-7-deazaguanosine); G (archaeosine); D (dihydrouridine); m5Um (5,2'-0-dimethyluridine); s4U (4-thiouridine); m5s2U (5-methyl-2-thiouridine); s2Um (2-thio-2'-0-methyluridine); acp3U (3-(3-amino-3-carboxypropyl)uridine); ho5U (5-hydroxyuridine); mo5U (5-methoxyuridine); cmo5U (uri dine 5-oxyacetic acid); mcmo5U (uri dine 5-oxyacetic acid methyl ester); chm5U (5-(carboxyhydroxymethyl)uridine)); mchm5U (5-(carboxyhydroxymethyl)uridine methyl ester); mcm5U (5-methoxycarbonyl methyluridine); mcm5Um (S-methoxycarbonylmethyl-2-O-methyluridine); mcm5s2U (5-methoxycarbonylmethyl-2-thiouridine); nm5s2U (5-aminomethyl-2-thiouridine); mnm5U (5-methylaminomethyluridine); mnm5s2U (5-methylaminomethyl-2-thiouridine); mnm5 se2U (5-methylaminomethyl-2-selenouridine); ncm5U (5-carbamoylmethyluridine); ncm5Um (5-carbamoylmethyl-2'-0-methyluridine); cmnm5U (5-carboxymethylaminomethyluridine); cnmm5Um (5-carboxymethylaminomethyl-2-LOmethyluridine); cmnm5s2U (5-carboxymethylaminomethyl-2-thiouridine); m62A (N6, N6-dimethyladenosine); Tm (2'-0-methylinosine); m4C (N4-methylcytidine); m4Cm (N4,2-0-dimethylcytidine); hm5C (5-hydroxymethylcytidine); m3U (3-methyluridine); cm5U (5-carboxymethyluridine); m6Am (N6,T-0-dimethyladenosine); rn62Am (N6,N6,0-2-trimethyladenosine); m2'7G (N2, 7-dimethylguanosine); m2'2'7G (N2,N2, 7-trimethylguanosine); m3Um (3,2T-0-dimethyluridine); m5D (5-methyldihydrouridine); f5Cm (5-formyl-2'-0-methylcytidine); ml Gm (1,2'-0-dimethylguanosine); m'Am (1,2-0-dimethyl adenosine) irinomethyluridine); tm5s2U (S-taurinomethyl-2-thiouridine); imG-l4 (4-demethyl guanosine); imG2 (isoguanosine); or ac6A (N6-acetyladenosine), hypoxanthine, inosine, 8-oxo-adenine, 7-substituted derivatives thereof, dihydrouracil, pseudouracil, 2-thiouracil, 4-thiouracil, 5-aminouracil, 5-(C1-C6)-alkyluracil, 5-methy luracil, 5-(C2-C6)-alkenyluracil, 5-(C2-C6)-alkynyluracil, 5-(hydroxymethyl)uracil, 5-chlorouracil, 5-fluorouracil, 5-bromouracil, 5-hydroxycytosine, 5-(C1-C6)-alkylcytosine, 5-methylcytosine, 5-(C2-C6)-alkenylcytosine, 5-(C2-C6)-alkynylcytosine, 5-chlorocytosine, 5-fluorocytosine, 5-bromocytosine, N2-dimethylguanine, 7-deazaguanine, 8-azaguanine, 7-deaza-7-substituted guanine, 7-deaza-7(C2-C6) alkynylguanine, 7-deaza-8-substituted guanine, 8-hydroxyguanine, 6-thioguanine, 8-oxoguanine, 2-aminopurine, 2-amino-6-chloropurine, 2,4-diaminopurine, 2,6-diaminopurine, 8-azapurine, substituted 7-deazapurine, 7-deaza-7-substituted purine, 7-deaza-8-substituted purine, or an abasic nucleotide. For instance, a self-replicating RNA can include one or more modified pyrimidine nucleobases, such as pseudouridine and/or 5-methylcytosine residues. In some embodiments, however, the RNA includes no modified nucleobases, and may include no modified nucleotides i.e. all of the nucleotides in the RNA are standard A, C, G and U ribonucleotides (except for any 5' cap structure, which may include a7'-methylguanosine). In other embodiments, the RNA may include a 5' cap comprising a 7'-methylguanosine, and the first 1, 2 or 3 5' ribonucleotides may be methylated at the 2' position of the ribose.

A RNA used with the invention ideally includes only phosphodiester linkages between nucleosides, but in some embodiments it can contain phosphoramidate, phosphorothioate, and/or methylphosphonate linkages.

Ideally, a liposome includes fewer than 10 different species of RNA e.g. 5, 4, 3, or 2 different species; most preferably, a liposome includes a single RNA species i.e. all RNA molecules in the liposome have the same sequence and same length.

The amount of RNA per liposome can vary. The number of individual self-replicating RNA 10 molecules per liposome is typically 50 e.g. <20, <10, <5, or 1-4 per liposome.

RNA molecules used with the invention encode a polypeptide immunogen. After administration of the liposomes the RNA is translated in vivo and the immunogen can elicit an immune response in the recipient. The immunogen may elicit an immune response against a bacterium, a virus, a fungus or a parasite (or, in some embodiments, against an allergen; and in other embodiments, against a tumor antigen). The immune response may comprise an antibody response (usually including IgG) and/or a cell-mediated immune response (e.g. a CD4 and/or CD8 T cell response). The polypeptide immunogen will typically elicit an immune response which recognises the corresponding bacterial, viral, fungal or parasite (or allergen or tumour) polypeptide, but in some embodiments the polypeptide may act as a mimotope to elicit an immune response which recognises a bacterial, viral, fungal or parasite saccharide. The immunogen will typically be a surface polypeptide e.g. an adhesin, a hemagglutinin, an envelope glycoprotein, a spike glycoprotein, etc.

Self-replicating RNA molecules can encode a single polypeptide immunogen or multiple polypeptides. Multiple immunogens can be presented as a single polypeptide immunogen (fusion polypeptide) or as separate polypeptides. If immunogens are expressed as separate polypeptides then one or more of these may be provided with an upstream IRES or an additional viral promoter element. Alternatively, multiple immunogens may be expressed from a polyprotein that encodes individual immunogens fused to a short autocatalytic protease (e.g. foot-and-mouth disease virus 2A protein), or as inteins.

In some embodiments of the methods herein, the RNA is a mRNA of at least 500 nucleotides, at least 1000 nucleotides, at least 1500 nucleotides, at least 2000 nucleotides, at least 2500 nucleotides, at least 3000 nucleotides, at least 3500 nucleotides, at least 4000 nucleotides, at least 4500 nucleotides, at least 5000 nucleotides, at least 5500 nucleotides, at least 6000 nucleotides, at least 6500 nucleotides, at least 7000 nucleotides, at least 7500 nucleotides, at least 8000 nucleotides, at least 8500 nucleotides, at least 9000 nucleotides, or more. In some embodiments of the methods herein, the RNA is a self-replicating RNA of at least 500 nucleotides, at least 1000 nucleotides, at least 1500 nucleotides, at least 2000 nucleotides, at least 2500 nucleotides, at least 3000 nucleotides, at least 3500 nucleotides, at least 4000 nucleotides, at least 4500 nucleotides, at least 5000 nucleotides, at least 5500 nucleotides, at least 6000 nucleotides, at least 6500 nucleotides, at least 7000 nucleotides, at least 7500 nucleotides, at least 8000 nucleotides, at least 8500 nucleotides, at least 9000 nucleotides, or more.

The RNA for use herein is prepared in an aqueous solution comprising water. The aqueous solution may further comprise excipients suitable for use with RNA. In some embodiments, the solution of RNA comprises citrate buffer.

General Parameters for Producing Liposomes Encapsulating RNA

As mentioned above, a process for preparing a RNA-containing liposome may comprise the steps of: (a) mixing RNA with a lipid at a pH which is below the lipid's pKa but is above 4.5; then (b) increasing the pH to be above the lipid's pKa. Thus a cationic lipid is positively charged during liposome formation in step (a), but the pH change thereafter means that the majority (or all) of the positively charged groups become neutral. This process is advantageous for preparing liposomes encapsulating RNA. By avoiding a pH below 4.5 during step (a) the stability of the encapsulated RNA is improved. The pH in step (a) is above 4.5, and is ideally above 4.8. Using a pH in the range of 5.0 to 6.0, or in the range of 5.0 to 5.5, can provide suitable liposomes. The increased pH in step (b) is above the lipid's pKa. The pH is ideally increased to a pH less than 9, and preferably less than 8. Depending on the lipid's pKa, the pH in step (b) may thus be increased to be within the range of 6 to 8 e.g. to pH 6.5±0.3. The pH increase of step (b) can be achieved by transferring the liposomes into a suitable buffer e.g. into phosphate-buffered saline. The pH increase of step (b) is ideally performed after liposome formation has taken place. RNA used in step (a) can be in aqueous solution, for mixing with an organic solution of the lipid (e.g. an ethanolic solution. The mixture can then be diluted to form liposomes, after which the pH can be increased in step (b).

The choice of device for mixing can impact the limits of the achievable average diameter (Zav, by intensity) of the population and/or polydispersity index. Certain devices also impact the capacity for safe, convenient and cost effective production of liposome-encapsulated nucleic acid on a commercially viable scale while preserving the physicochemical characteristics that maintain immunological performance.

Microfluidic Devices

A microfluidic device is a fluid handing apparatus wherein typically at least one aspect has a dimension on a sub-mm scale and typically mixing occurs through passive means (i.e. through contact of fluid streams and without moving parts within the mixing chamber). The microfluidic device will comprise a mixing chamber within which the first solution and second solution are mixed.

The mixing chamber will typically have a cross-sectional area which is 25.6 mm² or less, such as 12.8 mm² or less, suitably 6.4 mm² or less, especially 3.2 mm² or less and in particular 1.6 mm² or less. The mixing chamber will typically have a cross-sectional area which is 0.1 mm² or more, suitably 0.2 mm² or more, especially 0.3 mm² or more and in particular 0.4 mm² or more. In some embodiments the mixing chamber will have a cross-sectional area which is 0.2-3.2 mm², such as 0.4-1.6 mm², especially 0.6-1.2 mm² and in particular 0.7-1.0 mm² (e.g. 0.8 mm²).

The cross-section of the mixing chamber may be of any shape, though is typically symmetrical. The cross-section may be substantially rectangular (such as square). The cross-section may be elongate in nature, with the larger dimension being at least twice that of the perpendicular dimension, such as at least three times or at least four times. The larger dimension may be no more than ten times that of the perpendicular dimension, such as no more than eight times or no more than six times. The larger dimension will usually be two to ten times that of the perpendicular dimension, such as three to eight times, especially four to six times, in particular five times.

A rectangular cross-section may have a long side of 1-8 mm, such as 1-4 mm, for example 1.4-3.2 mm, especially 1.6-2.4 mm, in particular 1.8-2.2 mm (e.g. 2 mm). A rectangular cross-section may have a short side of 0.1 to 4 mm, for example, 0.1 to 2 mm, optionally 0.1-1.2 mm, such as 0.1-0.8 mm, especially 0.2-0.6 mm, in particular 0.3-0.5 mm (e.g. 0.4 mm).

The microfluidic device will have at least one inlet (such as one inlet) to the mixing chamber for delivery of the first solution. The device may have a plurality of inlets to the mixing chamber for delivery of the first solution, such as two inlets.

The microfluidic device will have at least one inlet to the mixing chamber for delivery of the second solution. The device may have a plurality of inlets to the mixing chamber for delivery of the second solution, such as two inlets.

To facilitate adequate mixing, the number of inlets for the first solution and second solution may be increased for mixing chambers with larger cross-sectional areas.

The cross-section of the inlets may be of any shape, though is typically symmetrical. The cross-section may be rectangular (such as square).

Each inlet will typically have a cross-sectional area which is 1.28 mm² or less, suitably 0.64 mm² or less, especially 0.32 mm² or less and in particular 0.16 mm² or less. Each inlet will typically have a cross-sectional area which is 0.01 mm² or more, suitably 0.02 mm² or more, especially 0.03 mm² or more and in particular 0.04 mm² or more. In some embodiments each inlet will have a cross-sectional area which is 0.02-0.32 mm², such as 0.04-0.16 mm², especially 0.06-0.12 mm² and in particular 0.07-0.10 mm² (e.g. 0.8 mm²).

The total cross-sectional area of all inlets will suitably be less than 70% of the cross-sectional area of the mixing chamber, such as less than 60% and especially less than 50%.

Conveniently, the inlets may span the full length of one side of the mixing chamber.

The shape and size of each inlet may be varied independently. However, typically inlets for the first solution will be identical in shape and size, and inlets for the second solution will be identical in shape and size. Conveniently, all inlets are identical in shape and size. A particular inlet design is rectangular in shape, 0.2 mm wide and spanning the full length of the other side of the mixing chamber (e.g. 0.4 mm high)

The inlets will typically be located such that the direction of flow of the first solution and second solution into the mixing chamber is substantially parallel (e.g. within 15 degrees, such as within 10 degrees, in particular within 5 degrees), such as parallel, to the general direction of flow through the mixing chamber. Microfluidic devices as described herein thus do not include apparati in which the direction of flow of the first solution and second solution into the mixing chamber are opposed, such as a Tee-junction or Tee-mixer.

The microfluidic device will have at least one outlet from the mixing chamber for recovery of the mixed material. The device may have a plurality of outlets from the mixing chamber for recovery of the mixed material, such as two or three outlets, which are later combined. Suitably the device will have a single outlet from the mixing chamber for recovery of the mixed material.

The cross-section of the outlets may be of any shape, though is typically symmetrical. The cross-section may be rectangular (such as square), typically having an area of 0.2-1 mm2, such as 0.3-0.6 mm2, for example 0.4-0.5 mm2. In other examples the outlet may be of circular cross-section (e.g. having a diameter of 0.5-1 mm, such as 0.6-0.8 mm, for example 0.75 mm).

The total cross-sectional area of all outlets will suitably be less than 70% of the cross-sectional area of the mixing chamber, such as less than 60% and especially less than 50%.

The mixing chamber should be of adequate length to allow for mixing to be substantially complete by the time liquid reaches the outlet(s). Typically, the chamber will be 1-10 cm in length, such as 1.5-5 cm, especially 1.8-4 cm, in particular 2-3 cm, for example 2.5 cm.

In one embodiment the device comprises a mixing chamber which is rectangular in cross-section, having a cross-sectional area of 0.2-3.2 mm2 (e.g. 0.6-1.0 mm2), a long side of 1.4-3.2 mm (e.g. 1.6-2.4 mm), a short side of 0.1-1.2 mm (e.g. 0.32-0.48 mm), one inlet for the first solution and two inlets for the second solution which are symmetrically disposed at the proximal end of the mixing chamber, a mixing chamber length of 1.5-5 cm (e.g. 2-3 cm) and an outlet located at the distal end of the mixing chamber. Suitably the inlets are 0.16-0.24 mm wide and span the full length of the other side of the mixing chamber.

The microfluidic device may be formed from any suitable material, namely one which is tolerant of the components used in the first solution and second solution and which is amenable to manufacture. Suitable materials include silicon and glass. Devices may be prepared from such materials by etching, e.g. silicon devices may be prepared by Deep Reactive Ion Etching (DRIE or plasma etching) and glass devices may be prepared by wet etching (HF etching).

To achieve a batch run duration which is a manageable time period (e.g. 240 minutes or less, especially 120 minutes or less) it is necessary for the system to achieve a sufficient level of productivity. Additionally, to aid batch to batch consistency by reducing the impact of start up and shutdown effects it is necessary for the run time to be of adequate length (e.g. at least 30 minutes, especially at least 60 minutes).

Methods for Producing Liposomes Encapsulating RNA by Microfluidics

The present invention provides methods for manufacturing a non-viral delivery system comprising a liposome encapsulating an RNA using a microfluidic device. In some embodiments, the methods involve mixing a first lipid solution comprising a solvent with a second aqueous RNA solution, then removing the solvent. In some embodiments, the methods involve mixing a lipid/RNA solution comprising solvent and then removing the solvent.

In some embodiments, the methods of manufacturing a non-viral delivery system comprising a liposome encapsulating an RNA using a microfluidic device, comprise the following steps: (a) mixing in the device a solution comprising a solvent, water, the RNA, an ionizable cationic lipid having a pKa of 5.5-6.7, DSPC, a sterol, a PEGylated lipid selected from the group consisting of PEG-PE and PEG-DMG; and (b) removing the solvent; wherein the microfluidic device comprises 2-128 mixing chambers.

In some embodiments, the methods of manufacturing a non-viral delivery system comprising a liposome encapsulating an RNA using a microfluidic device, comprise the following steps: (a) mixing in the device (i) a first solution comprising a solvent, an ionizable cationic lipid having pKa 5.5-6.7, DSPC, cholesterol, and a PEGylated lipid selected PEG-PE and PEG-DMG; and (ii) a second solution comprising water and the RNA; and (b) removing the solvent; wherein the microfluidic device comprises 2-128 mixing chambers.

Components utilized in the methods herein may be mixed at proportions that successfully produce LNP having acceptable physico-chemical characteristics. Further, the methods herein may be utilized at specific temperatures and/or flow rates to enhance the physico-chemical characteristics of the LNPs produced.

For instance, the cationic lipid contains nitrogen and the RNA contains phosphate. One μg of RNA contains three nmoles of phosphate. In some embodiments, the nitrogen: phosphate (N:P) ratio is between 1:1 and 10:1; between 2:1 and 9:1; between 3:1 and 8:1; between 4:1 and 8:1; between 5:1 and 8:1. In some embodiments, the N:P ratio is selected from about 1:1; about 2:1; about 3:1; or about 4:1; about 5:1; about 6:1; about 7:1; about 8:1; about 9:1; about 10:1. In some embodiments the N:P ratio is 8:1. In an embodiment where the N:P ratio is 8:1, if the RNA is present at 40 μg/mL (120 nmoles), then the cationic lipid would be present at 960 nmoles.

The ratio of aqueous to organic components used herein may be adjusted to successfully produce LNP having acceptable physico-chemical characteristics. In some embodiments, the ratio of water (i.e., aqueous solution) to organic solvent is between 1:1 and 5:1 v/v; between 1.25:1 and 4:1 v/v; between 1.5:1 and 3:1 v/v. In some embodiments, the ratio of water to organic solvent is about 1.4:1 v/v; about 2:1 v/v; or about 3:1 v/v. In some embodiments, the ratio of water to organic solvent is about 2:1 v/v. In some embodiments, the organic solvent is ethanol, and the ratio of water to ethanol is between 1:1 and 5:1 v/v; between 1.25:1 and 4:1 v/v; between 1.5:1 and 3:1 v/v. In some embodiments, the ratio of water to ethanol is about 1.4:1; about 2:1; or about 3:1. In some embodiments, the ratio of water to ethanol is about 2:1.

By controlling the total flow rate (TFR) in the microfluidic device, one may successfully produce LNP having acceptable physico-chemical characteristics. Microfluidic devices as described herein are capable of producing LNP having acceptable physico-chemical characteristics while driven at commercially significant flowrates (greater than 1.0 ml/min/mm$^2$) and thus do not include apparatus such as a Tee-junction or Tee-mixer. In some embodiments, a TFR in the device of greater than 8 ml/min/mm$^2$ successfully produces LNP having acceptable physico-chemical characteristics. In some embodiments, the TFR is between 8-30 mL/min/mm$^2$, 12-28 mL/min/mm$^2$, 14-26 mL/min/mm$^2$, 16-24 mL/min/mm$^2$, or about 18 mL/min/mm$^2$ or about 22 mL/min/mm$^2$.

The temperature of the solution or solutions within the device may also be adjusted to successfully produce LNP having acceptable physico-chemical characteristics. In some embodiments, the temperature of the solution in the microfluidic device is between 10° C. and 37° C., such as between 15° C. and 36° C., between 15° C. and 36° C.; between 15° C. and 19° C.; between 19° C. and 24° C.; between 24° C. and 28° C.; between 28° C. and 36° C., between 20° C. and 35° C., between 25° C. and 34° C., between 30° C. and 33° C., about 17° C., about 22° C., about 26° C., or about 30° C.

By controlling the ratio of the flow rate of aqueous to organic solvent in the microfluidic device while maintaining the TFR as described above, one may successfully produce LNP having acceptable physico-chemical characteristics. In some embodiments, the ratio of the flow rate of aqueous solvent to the flow rate of organic solvent is between 1:1 and 5:1, such as about 1.4:1; about 2:1; or about 3:1. In some embodiments, the ratio of the flow rate aqueous solvent to the flow rate of organic solvent is about 2:1. In some embodiments, the aqueous solvent is water comprising a buffer and the organic solvent is ethanol and the ratio of the flow rate of water to ethanol is between 1:1 and 5:1, such as about 1.4:1; about 2:1; or about 3:1. In some embodiments, the ratio of the flow rate of water to the flow rate of ethanol is about 2:1.

In some embodiments, the use of the methods above produces a liposome with an average size of 140 nm or lower, 130 nm or lower, 120 nm or lower, or 100 nm or lower. In some embodiments, the use of the methods above produces a liposome with a polydispersity of 0.3 or lower, 0.2 or lower, or 0.1 or lower.

Microfluidic Device Scale-Up

In order to facilitate production of liposome encapsulating an RNA on an industrial scale (e.g. a scale of at least 0.5 g of cationic lipid per minute, such as at least 1 g per minute, in particular at least 2 g per minute and especially at least 4 g per minute), large mixing chambers may be used or plurality of mixing chambers may be operated in parallel. For example, 2 or more mixing chambers, in particular 4 or more, especially 8 or more, such as 16 or more (e.g. 16). The plurality of mixing chambers operated in parallel may be 128 or fewer, such as 64 or fewer, in particular 32 or fewer. Consequently, in some embodiments the plurality of mixing chambers is 2-128, such as 4-64, for example 8-32.

In some circumstances each mixing chamber from the plurality of mixing chambers may be operated independently, with provision of the first solution and second solution to the mixing chamber by independent pumps (i.e. each pump not concurrently providing solution to any other mixing chamber). The first solution and/or second solution may be stored in independent containers (i.e. containers not concurrently providing first solution and/or second solution to more than one mixing chamber), or first solution and/or second solution may be stored in a container for use in more than one mixing chamber (such as all mixing chambers). Mixed material from each mixing chamber may be recovered individually and stored/processed, optionally being combined at a later stage, or may be combined (e.g. from all mixing chambers) before further processing and/or storage.

Conveniently all mixing chambers in the plurality of mixing chambers are supplied by the same pumps and mixed material from all mixing chambers is collected before further processing and/or storage.

Optimally the mixing chambers, inlets and outlets, supply of first solution, second solution and collection of mixed material of multiple mixing chambers are configured such that in operation they perform substantially identically.

Each mixing chamber from the plurality of mixing chambers may be configured as an individual chip or for convenience a number of mixing chambers may be combined in a single chip (e.g. containing 8 mixing chambers). A number of such chips can be used in parallel to provide the plurality of chambers (e.g. two chips each of which contains 8 mixing chambers to provide a total of 16 mixing chambers to be operated in parallel).

Suitably the plurality of mixing chambers is capable of producing mixed material at a total rate of 50-2000 ml/min, such as 100-1000 ml/min, in particular 200-500 ml/min. In some embodiments, the plurality of mixing chambers is capable of producing mixed material at a rate of at least 1 g of cationic lipid per minute. In some embodiments, all mixing chambers in the plurality of mixing chambers are supplied by the same pumps and mixed material from all mixing chambers is collected before further processing and/or storage.

Post Microfluidic Process Steps

In some embodiments, the solvent is removed by buffer exchange, diafiltration, ultrafiltration, dialysis, or a combination thereof. In some embodiments, solvent removal results in a water content of at least 95%; at least 96%; at least 97%; at least 98%; at least 99% at least 99.5% water v/v. In some embodiments, the methods described above are followed by an additional step of diluting, such as to a desired final concentration. In some embodiments, the methods described above are followed by the additional step of sterilization by filtration.

Pharmaceutical Compositions

Liposomes of the invention are useful as components in pharmaceutical compositions for immunising subjects against various diseases. These compositions will typically include a pharmaceutically acceptable carrier in addition to the liposomes. A pharmaceutical composition of the invention may include one or more small molecule immunopotentiators. For example, the composition may include a TLR2 agonist (e.g. Pam3CSK4), a TLR4 agonist (e.g. an aminoalkyl glucosaminide phosphate, such as E6020), a TLR7 agonist (e.g. imiquimod), a TLR8 agonist (e.g. resiquimod (also a TLR7 agonist)) and/or a TLR9 agonist (e.g. IC31). Any such agonist ideally has a molecular weight of <2000 Da. In some embodiments such agonist(s) are also encapsulated with the RNA in liposomes, but in other embodiments they are unencapsulated. Pharmaceutical compositions of the invention may include the liposomes in plain water (e.g. w.f.i.) or in a buffer e.g. a phosphate buffer, a Tris buffer, a borate buffer, a succinate buffer, a histidine buffer, or a citrate buffer. Buffer salts will typically be included in the 5-20 mM range. Pharmaceutical compositions of the invention may have a pH between 5.0 and 9.5 e.g. between 6.0 and 0. Compositions of the invention may include sodium salts (e.g. sodium chloride) to give tonicity. A concentration of 10±2 mg/ml NaCl is typical e.g. about 9 mg/mL.

Compositions of the invention may include metal ion chelators. These can prolong RNA stability by removing ions which can accelerate phosphodiester hydrolysis. Thus a composition may include one or more of EDT A, EGT A, BAPT A, pentetic acid, etc. Such chelators are typically present at between 10-500 mM e.g. 0.1 mM. A citrate salt, such as sodium citrate, can also act as a chelator, while advantageously also providing buffering activity.

Pharmaceutical compositions of the invention may have an osmolality of between 200 mOsm/kg and 750 mOsm/kg, e.g. between 240-360 mOsm/kg, or between 290-310 mOsm/kg. Pharmaceutical compositions of the invention may be hypotonic or mildly hypertonic. Pharmaceutical compositions of the invention may include one or more preservatives, such as thiomersal or 2-phenoxyethanol. Mercury-free compositions are preferred, and preservative-free vaccines can be prepared.

Pharmaceutical compositions of the invention are preferably sterile. Pharmaceutical compositions of the invention are preferably non-pyrogenic e.g. containing <1 ED (endotoxin unit, a standard measure) per dose, and preferably <0.1 EU per dose. Pharmaceutical compositions of the invention are preferably gluten free. Pharmaceutical compositions of the invention may be prepared in unit dose form. In some embodiments a unit dose may have a volume of between 0.1-1.0 ml e.g. about 0.5 ml.

The compositions may be prepared as injectables, either as solutions or suspensions. The composition may be prepared for pulmonary administration e.g. by an inhaler, using a fine spray. The composition may be prepared for nasal, aural or ocular administration e.g. as spray or drops. Injectables for intramuscular administration are typical. Compositions comprise an immunologically effective amount of liposomes, as well as any other components, as needed. By 'immunologically effective amount', it is meant that the administration of that amount to an individual, either in a single dose or as part of a series, is effective for treatment or prevention. This amount varies depending upon the health and physical condition of the individual to be treated, age, the taxonomic group of individual to be treated (e.g. non-human primate, primate, etc.), the capacity of the individual's immune system to synthesise antibodies, the degree of protection desired, the formulation of the vaccine, the treating doctors assessment of the medical situation, and other relevant factors. It is expected that the amount will fall in a relatively broad range that can be determined through routine trials. The liposome and RNA content of compositions of the invention will generally be expressed in terms of the amount of RNA per dose. A preferred dose has 20≤100 g RNA (e.g. from 10-100 µg, such as about 10 µg, 25 µg, 50 µg, 75 µg or 100 µg), but expression can be seen at much lower levels e.g. ≤1 µg/dose, ≤100 ng/dose, ≤10 ng/dose, ≤1 ng/dose, etc.

The invention also provides a delivery device (e.g. syringe, nebuliser, sprayer, inhaler, dermal patch, etc.) containing a pharmaceutical composition of the invention. This device can be used to administer the composition to a vertebrate subject. Liposomes of the invention do not contain ribosomes.

Methods of Treatment and Medical Uses

Liposomes and pharmaceutical compositions of the invention are for in vivo use for eliciting an immune response against an immunogen of interest, or for gene therapy. As disclosed herein, methods for raising an immune response in a vertebrate comprising the step of administering an effective amount of a liposome or pharmaceutical composition of the invention are provided. The immune response is preferably protective and preferably involves antibodies and/or cell mediated immunity. The method may raise a booster response.

The invention also provides a liposome or pharmaceutical composition of the invention for use in a method for raising an immune response in a vertebrate. The invention also provides a liposome or pharmaceutical composition of the invention for use in a method of gene therapy in a vertebrate.

The invention also provides the use of a liposome of the invention in the manufacture of a medicament for raising an immune response in a vertebrate.

By raising an immune response in the vertebrate by these uses and methods, the vertebrate can be protected against various diseases and/or infections e.g. against bacterial and/or viral diseases as discussed above. The liposomes and compositions are immunogenic, and are more preferably vaccine compositions. Vaccines according to the invention may either be prophylactic (i.e. to prevent infection) or therapeutic (i.e. to treat infection), but will typically be prophylactic.

The vertebrate is preferably a mammal, such as a human or a large veterinary mammal (e.g. horses, cattle, deer, goats, and pigs). Where the vaccine is for prophylactic use, the human is preferably a child (e.g. a toddler or infant) or a teenager; where the vaccine is for therapeutic use, the human is preferably a teenager or an adult. A vaccine intended for children may also be administered to adults e.g. to assess safety, dosage, immunogenicity, etc.

Vaccines prepared according to the invention may be used to treat both children and adults. Thus a human patient may be less than 1 year old, less than 5 years old, 1-5 years old, 5-15 years old, 15-55 years old, or at least 55 years old. Preferred patients for receiving the vaccines are the elderly (e.g. 20 50 years old, 60 years old, and preferably 65 years), the young (e.g. 5 years old), hospitalised patients, healthcare workers, armed service and military personnel, pregnant women, the chronically ill, or immunodeficient patients. The vaccines are not suitable solely for these groups, however, and may be used more generally in a population.

Compositions of the invention will generally be administered directly to a patient. Direct delivery may be accomplished by parenteral injection (e.g. subcutaneously, intraperitoneally, intravenously, intramuscularly, intradermally, or to the interstitial space of a tissue. Alternative delivery routes include rectal, oral (e.g. tablet, spray), buccal, sublingual, vaginal, topical, transdermal or transcutaneous, intranasal, ocular, aural, pulmonary or other mucosal administration. Intradermal and intramuscular administration are two preferred routes. Injection may be via a needle (e.g. a hypodermic needle), but needle-free injection may alternatively be used. A typical intramuscular dose is 0.5 mL.

The invention may be used to elicit systemic and/or mucosal immunity, preferably to elicit an enhanced systemic and/or mucosal immunity.

Dosage can be by a single dose schedule or a multiple dose schedule. Multiple doses may be used in a primary immunisation schedule and/or in a booster immunisation schedule. In a multiple dose schedule the various doses may be given by the same or different routes e.g. a parenteral prime and mucosal boost, a mucosal prime and parenteral boost, etc. Multiple doses will typically be administered at least 1 week apart (e.g. about 2 weeks, about 3 weeks, about 4 weeks, about 6 weeks, about 8 weeks, about 10 weeks, about 12 weeks, about 16 weeks, etc.). In one embodiment, multiple doses may be administered approximately 6 weeks, 10 weeks and 14 weeks after birth, e.g. at an age of 6 weeks, 10 weeks and 14 weeks, as often used in the World Health Organisation's Expanded Program on Immunisation ("EPI"). In an alternative embodiment, two primary doses are administered about two months apart, e.g. about 7, 8 or 9 weeks apart, followed by one or more booster doses about 6 months to 1 year after the second primary dose, e.g. about 6, 8, 10 or 12 months after the second primary dose. In a further embodiment, three primary doses are administered about two months apart, e.g. about 7, 8 or 9 weeks apart, followed by one or more booster doses about 6 months to 1 year after the third primary dose, e.g. about 6, 8, 10, or 12 months after the third primary dose.

General

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. The term "plurality" refers to two or more. Additionally, numerical limitations given with respect to concentrations or levels of a substance, such as solution component concentrations or ratios thereof, and reaction conditions such as temperatures, pressures and cycle times are intended to be approximate. The term "about" used herein is intended to mean the amount ±10%. Unless specified otherwise, where a numerical range is provided, it is inclusive, i.e., the endpoints are included.

The invention will be further described by reference to the following, non-limiting, figures and examples.

EXAMPLES

Example 1

The principles of flash-nanoprecipitation were applied to the problem of developing manufacturing approaches which enable the safe, convenient and cost effective production of liposome-encapsulated nucleic acid on a commercially viable scale while preserving the physicochemical characteristics that maintain immunological performance arising from conventional manufacturing approaches. Flash-nanoprecipitation involves two miscible fluids that are mixed inside a microchip to induce a precipitation. Lipids are solubilized in an organic phase (solvent) and mixed with mRNA in water based phase (anti solvent) in order to make particles. The nanoflashprecipitation process described in these examples is based on the mixing conditions impacting the precipitation of the DSPC, RV39, cholesterol and PEG-lipid (C14:0-PEG2K) in the organic solvent when mixed with the RNA in aqueous phase (anti-solvent).

Materials

TABLE 1

Material.

| Material and Instrument | Vendor | Catalog # |
|---|---|---|
| RNase-free Microfuge Tubes (0.5 mL, 1.5 mL, 2 mL | Ambion/Life-technologies | AM12350; AM12400; AM12425 |
| RNase free 15 mL conical tubes (reached) | Ambien/Life-technologies | AM12500 |
| PD-10 Desalting Column | GE-Healthcare | GE17-0851-01 VWR |
| Ethanol p.a., ACS reagent, absolute alcohol, without additive, A15 o1, ≥99.8% | Sigma-Aldrich | 02860 |
| QB Citrate Buffer, 100 mM, pH 6.0 | Teknova | Q2446 |
| Cationic Lipid-RV39 | GSK Pharma | |
| DSPC | CordenPharma | LP-R4-076 |
| Cholesterol | Sigma Aldrich | C3045-5G |
| 14:0-PEG2K PE | Avanti | 880150P |
| 1M Sodium Hydroxide solution | Sigma Aldrich | 71463-1L |
| RNase Zap ™ solution | Ambien | AM9780 |
| 10X PBS Rnase free | Ambien/Life-technologies | AM9625 |
| Nuclease-free water | Ambien | AM9937 |

Equipment

Figure 1:
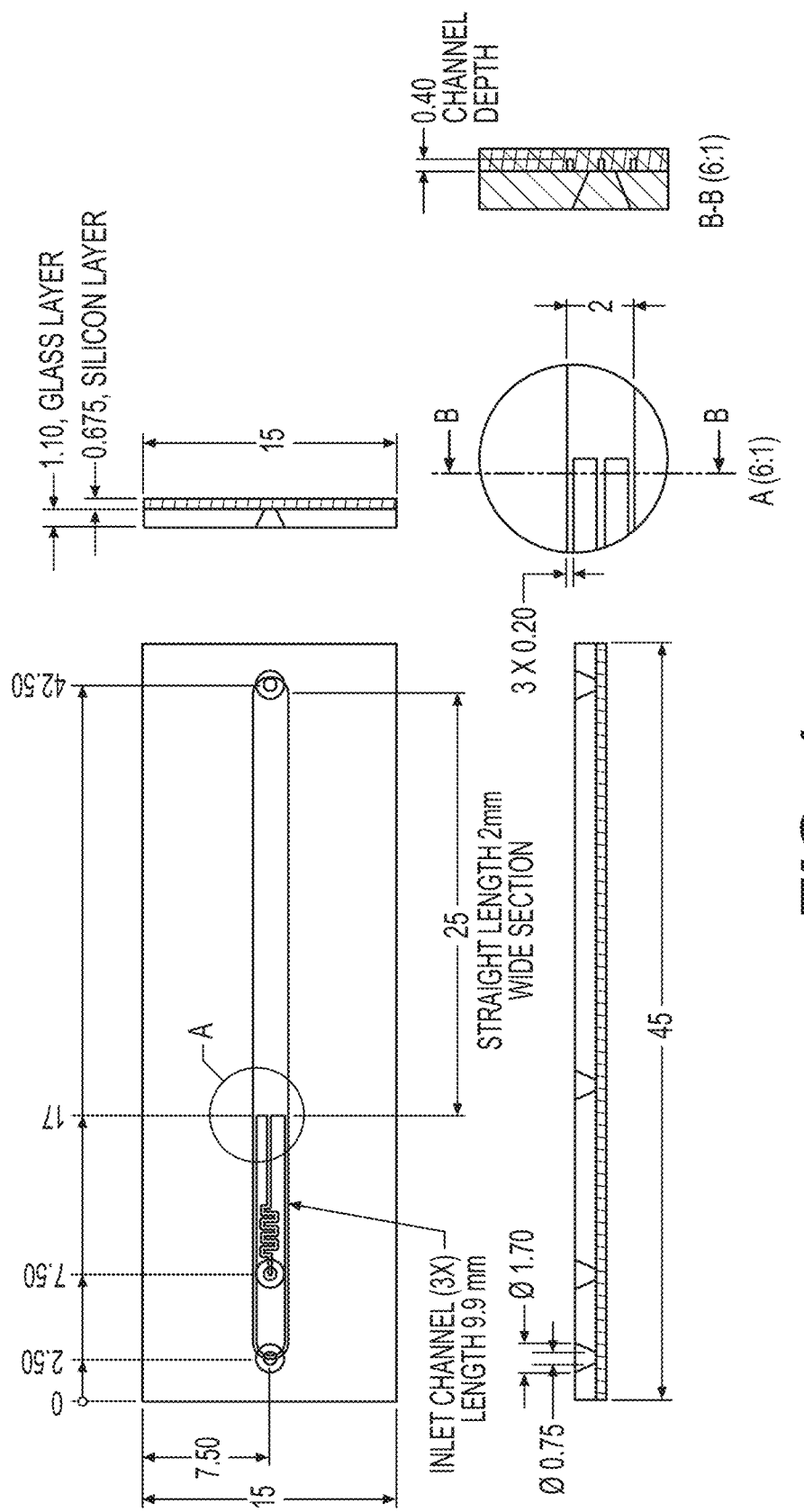
FIG. 1 shows the design of the microfluidic device utilized in the examples.

The schematic for a microchip (from Micronit Microtechnologies™) used in the examples herein is shown in FIG. 1. Two mid pressure Nemesys™ pumps were connected to the microchip via a chip-holder available from MicroNit. Tubing connections were diameter: IDEX 1528L 1/16×0.030 ft. One was used for the organic phase containing the lipid mixture (connected to center channel of the microfluidic). The second was used for the aqueous phase containing citrate buffer and the RNA (connected to the external channels)

The Nemesys pumps were controlled by the "neMESYS Userinterface™" installed on a computer.

Experimental Parameters, Preparation, Stock Solutions

The following volumes were utilized for the first evaluation:

Organic phase: 1-5 ml in 1 ml-5 ml Cetoni™ glass syringe
Aqueous phase: 2.5-10 ml in 2.5-10 ml Cetoni glass syringe
Run time: depending on the flow rate tested.

The first 0.5 ml exiting the microchip was discarded. (Purge of the system) The next 2-3 ml were collected.

Working areas were treated with RNase Decontamination Solution (RNaseZap™) The operator wore gloves and treated it with an RNase Decontamination Solution. The buffer and water were RNAse free. All the containers have were RNAse free.

The RNA stock solution was kept at −80° C. until the beginning of the experiments without freeze thawing.

Formulations were made at an N: P (Nitrogen: Phosphate) ratio of 8:1, where the cationic lipid contained nitrogen and RNA contained phosphate. 1 μg of RNA contains 3 nmoles phosphate. The proportion was kept. So, for example: 120 nmoles phosphate corresponded to 960 nmoles nitrogen at 8:1 N:P ratio.

For the preparation of lipids stock solutions RNAse free glass vials were used.

RV39, DSPC and cholesterol were weighed in separated vials and solubilized by ethanol to obtain a solution at 10 mg/ml. PEG2K was solubilized at 4 mg/ml in Ethanol. A minimum of 1 mL of stock solution was made for each lipid.

Vials were sonicated 1 min and then heated in water bath at 37° C. for 5 min at 170 rpm.

For the preparation of 1000 μl of lipid mixture, the calculated volumes of lipids stocks and ethanol were added. see Table 1.

port) by filling up a syringe with ethanol and delivering ethanol to the microchip to rinse the system completely. This was repeated twice. Then the RNA port was loaded with citrate buffer and lipid port with ethanol by fill a syringe with the relevant solution and then delivering either the aqueous or organic solution to the microchip. This was repeat twice.

The system was then loaded with RNA and lipids. The right syringe was filled with organic/lipids solution and the left syringe was filled with aqueous RNA solution. The flow rate needed in order to comply with the chosen ratio was programed into the software and the nanopreciptation process was started.

The LNPs were harvested as follows. The first 0.2-0.5 ml were discarded (until a good vortex was visualized with no bubble in the microchip). The LNP were harvested in a conical RNAse free container and put on the ice until buffer exchange step. (Typically no more than 30 min).

Post microfluidics system cleaning was the same as the pre-microfluidics process provided above.

Buffer Exchange

Formulated LNPs were exchanged into the desired formulation buffer by using a PD10 column. The column was equilibrated with 10 mM Tris buffer (25 ml). Samples were loaded with a maximum volume of 2.5 ml per column. Elution was made with 12×0.5 ml of 10 mM Tris HCL buffer. 0.5 ml fractions were harvested in 1.5 ml Eppendorf. UV nephelostar detection of fractions was made in 96 wells Costar 100 μl microplate. The fractions containing LNP were pooled and stored at 4° C.

Sterile Filtration

Sterile filtration was performed with Millipore Millex-GP™ 0.2 μm PES 33 mm SLGP033RS filter (PES membrane −0.2 μm) 33 mm.

LNP Characterization

Size measurement by DLS (Zetasizer™). The LNP samples were diluted 1:500 in 0.22 μm filtered PBS or citrate buffer. 40 μL of each sample was added in disposable micro cuvettes 40 μL (Malvern ZEN0040™). Five measurements are made and the average was calculated.

RNA LNP ribogreen assay. The RNA ribogreen assay was carried out using the commercial kit Quant-It RiboGreen RNA Assay Kit™ from Invitrogen.

TABLE 2

| Composition | MW | % | nmoles | mg | Stock (mg/mL) | μL | Ethanol (μL) |
|---|---|---|---|---|---|---|---|
| RV39 | 750.19 | 40% | 960 | 0.72 | 10 | 96.0 | 776.3 |
| DSPC | 790.15 | 10% | 240 | 0.19 | 10 | 25.3 | |
| Cholesterol | 386.67 | 48% | 1152 | 0.45 | 10 | 59.3 | |
| 14:0-PEG2K PE | 2693.3 | 2% | 48 | 0.13 | 4 | 43.1 | |

Columns 2-5 of the table show molecular weight for each lipid, mole percentages selected for each lipid, equivalent nmoles for each lipid given 960 nmoles of RV39 at the relevant mole percentages; and milligrams of each lipid at the relevant mole percentages. Columns 6-8 shows the stock solution concentration of each component and the microliters of each stock plus ethanol in order to produce a lipid stock solution having 10 mg/mL of total lipid at the relevant mole percent.

The RNA mixture was made in RNAse free conical tube of 1.5 ml to 15 ml. Calculated volumes of RNA stock solution (to conserve N:P Ratio) were diluted in 100 mM Citrate Buffer, pH 6. The RNA mixture was prepared extempo just before microfluidics.

Microfluidics

A cleaning step was done before using the microfluidics system. Ethanol was loaded to both ports (RNA and Lipid Protocol for LNP Ribogreen Assay 1. Dilute 20× TE Buffer down to 1×: Add 2 mL 20× TE to 38 mL water.
2. Make a 0.1% solution of Triton X-100 in 1× TE buffer (mass out 25 mg of Triton and add 25 mL buffer).
3. Serially dilute 3 times your sample 1:5 (200 μL into 800 μL 1× TE Buffer), 1:10 (500 μL dil 1:5 into 500 μL 1× TE Buffer, 1:20 (500 μL dil 1:10 into 500 μL) in 1× TE buffer.
4. Prepare standards in duplicate: Prepare a 4 μg/mL stock: add 20 uL RNA (at 100 μg/mL) to 480 μL 1× TE buffer. Serially dilute 4 times (250 μL into 250 μL 1× TE Buffer). Add 50 uL standard and 50 uL TE or Triton to each well (see order below) so all wells have 100 uL volume.
5. Add 50 μL of LNP samples (in triplicate) and dilute 2 fold using 50 μL of 1× TE buffer.
6. Add 50 μL of LNP samples (in triplicate) and dilute 2 fold using 50 μL of 0.1% Triton X.

7. Dilute down Ribogreen reagent 200-fold by adding 25 µL Ribogreen to 4975 µL 1× TE buffer for 5 mL total.

8. Add 100 µL of diluted Ribogreen reagent to 100 µL sample or standard.

9. Let sit in the dark at 37° C. for 15 min. Let cool down in the dark at 20° C. for 10 min 300 rpm.

10. Read fluorescence at 485/20, 528/20, optimal gain, using Gen5 program.

11. *Calculate the concentration.
   a. Make standard curve.
   b. Subtract the TE value from the Triton X value to get the encapsulated value.
   c. Extrapolate the concentration using the standard curve.
   d. Multiply by the dilution factor.

TABLE 3

Materials for RiboGreen assay.

| Material and Instrument | Vendor | Catalog # |
|---|---|---|
| Quant-It RiboGreen RNA Assay Kit | Invitrogen | R11490 |
| 96 flat-well plate flat bottom black | EPPENDORF | H 0030 601 700 |
| Nuclease-free water | Ambien | AM9937 |
| Triton X-100 | Sigma Aldrich | T8787 |

The principle was to quantify the RNA in the native sample (RNA outside the LNP) and the RNA after LNP TritonX™ treatment (total RNA). The difference between the total RNA and the RNA outside the LNP give the RNA inside the LNP. The yield of RNA encapsulation can be easily calculated taking RNA inside LNP divided by total RNA and the expressed in percentage.

A script was done with TECAN™ to realize the Ribogreen assay in an automatic way and less time consuming for the operator.

Example 2

(A) Exploratory Experiments to Evaluate Microfluidics Working Zone

Three exploratory experiments were made to evaluate the working process zone. In three exploratory experiments the Applicants evaluated the possibility of producing bare LNP and the Total Flow Rate (TFR), N:P, and aqueous/Organic Ratio as key parameters. The robustness of the process was evaluated.

TFR (6-12-14 ml/min)
Ratio aqueous to Organic phase (2:1 to 10:1)
Ratio Nitrogen to Phosphate. (2:1 to 8:1)

TABLE 4

Investigation of TFR, aqueous:organic ratio, N:P ratio.

| Sample Name | Aqueous Phase | TFR ml/min | Ratio aqueous/org phase | Z-Ave d · nm | PdI |
|---|---|---|---|---|---|
| SAM1-A | citrate Buffer | 12 | 2 | 140.8 | 0.055 |
| SAM1-B | citrate Buffer | 12 | 5 | 131.8 | 0.051 |
| SAM1-C | citrate Buffer | 12 | 10 | 136.4 | 0.056 |
| SAM1-D | citrate Buffer | 6 | 2 | 202.3 | 0.078 |
| SAM1-E | citrate Buffer | 6 | 5 | 180.3 | 0.131 |
| SAM1-F | citrate Buffer | 6 | 10 | 179.1 | 0.144 |
| SAM1-G | citrate Buffer | 14 | 2 | 128.2 | 0.062 |

It was observed that an increase of TFR results in a decrease in size of LNP. At lower TFR (6 ml/min) increase of ratio decrease size of LNP.

(B) Addition of RNA

The second experiment was done to repeat observations done in the experiment (A) in the presence of RNA. An additional filtration step was also evaluated.

TABLE 5

TFR, Ratio (Aqueous/Organic phase), Ratio N:P.

| Sample Name | N:P Ratio | TFR ml/min | Ratio (aqueous/org phase) | RNA encapsulation amount (µg/ml) | RNA encapsulation yield | size nm | PDI |
|---|---|---|---|---|---|---|---|
| SAM2-A | 2 | 12 | 2 | NA | | 163 | 0.065 |
| SAM2-E | | | 2 | 1.56 | 13% | 160 | 0.087 |
| SAM2-B | 8 | 14 | 2 | 8.72 | 74% | 125.3 | 0.069 |
| SAM2-C | | 12 | 2 | 6.65 | 56% | 159.8 | 0.102 |
| SAM2-G | | 12 | 5 | 5.21 | 35% | 196.4 | 0.168 |

It was observed that increasing TFR decreases size of LNP and increases RNA encapsulation rate. Increasing aqueous:organic phase ratio increase size of LNP. Maximum total Flow rate (14 ml/min) seems to be best candidate to have LNP around 120 nm. No negative impact of filtration on RNA recovery is observed. TFR (total flow rate) identified as key working parameter.

TABLE 6

Inter-experiment robustness evaluation.

| Sample Name | RNA content µg/ml | RNA encapsulation Yield % | size nm | PDI |
|---|---|---|---|---|
| SAM4-B | 8.56 | 72% | 140.1 | 0.21 |
| SAM5-B | 8.48 | 80% | 140.2 | 0.20 |

Results suggested good reproducibility and robustness with tested compounds. SAM4-B and SAM-5B batches were run out on different days and with different lipids/RNA solution preparation.

Figure 2:
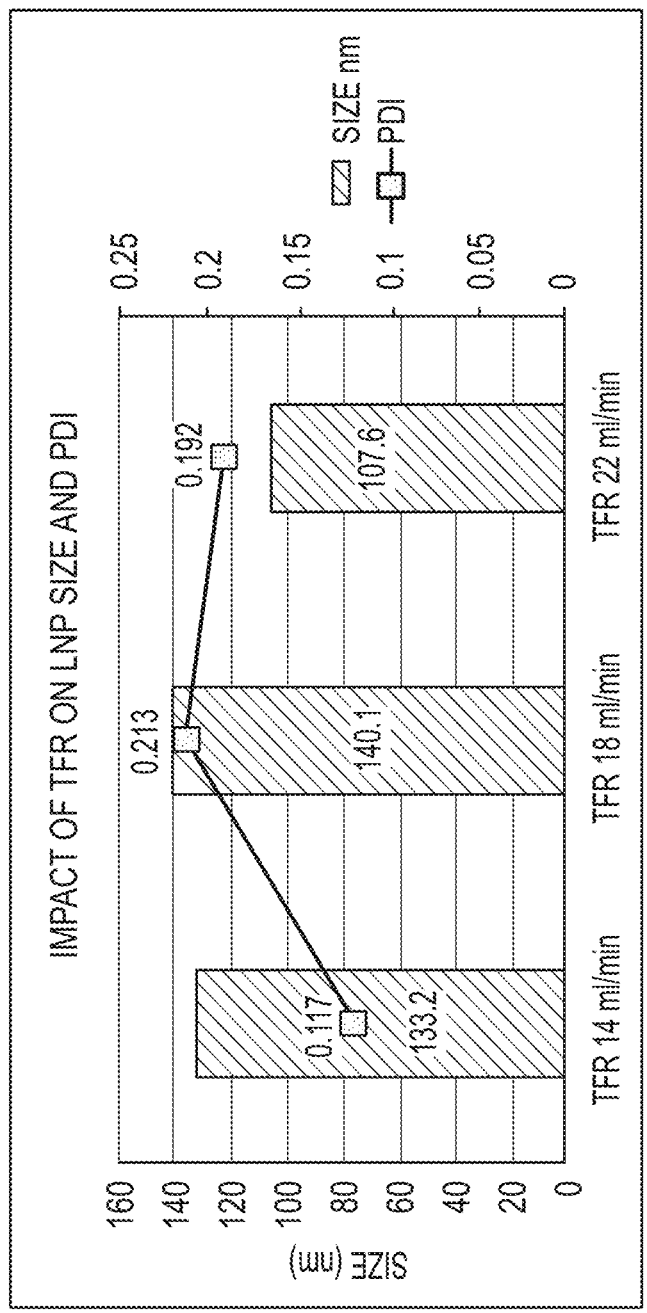
FIG. 2 shows the impact of TFR on LNP size and PDI.

(C) Evaluation of Microfluidics Parameters Impact on LNP Physico-Chemical Attributes (1) TFR As discussed above, increasing the TFR had the impact of decreasingLNP size. We decided to investigate the feasibility to increase TFR up to 22 ml to reach a size of LNP around 100 nm. See FIG. 2.

At ratio 2:1 (Aqueous/Organic phase), working at a TFR of 22 ml/min provide LNP encapsulating RNA with a size of 107.6 nm and a PDI<0.2.

Figure 3:
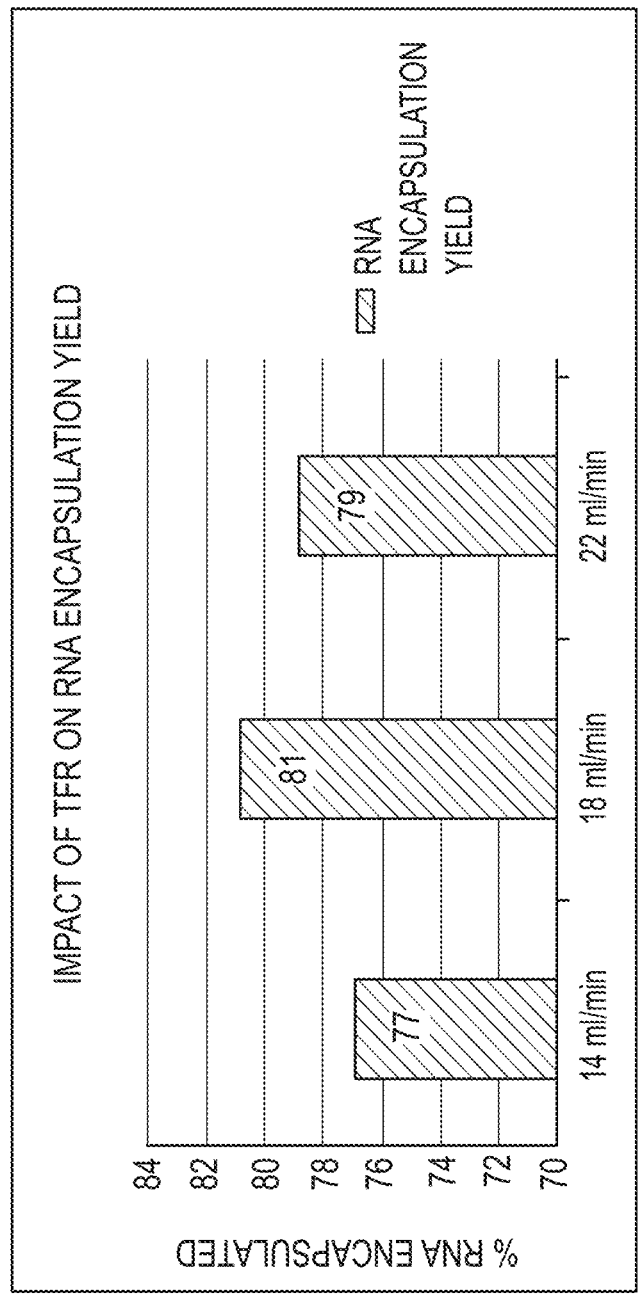
FIG. 3 shows the impact of increasing TFR on encapsulation.

For the RNA encapsulation yield, as previously observed, increasing TFR had the impact of increasing the encapsulation rate. An investigatation of the feasibility of increasing TFR up to 22 ml was carried out. The results are shown in FIG. 3.

(2) Aqueous:Organic Ratio

Figure 4:
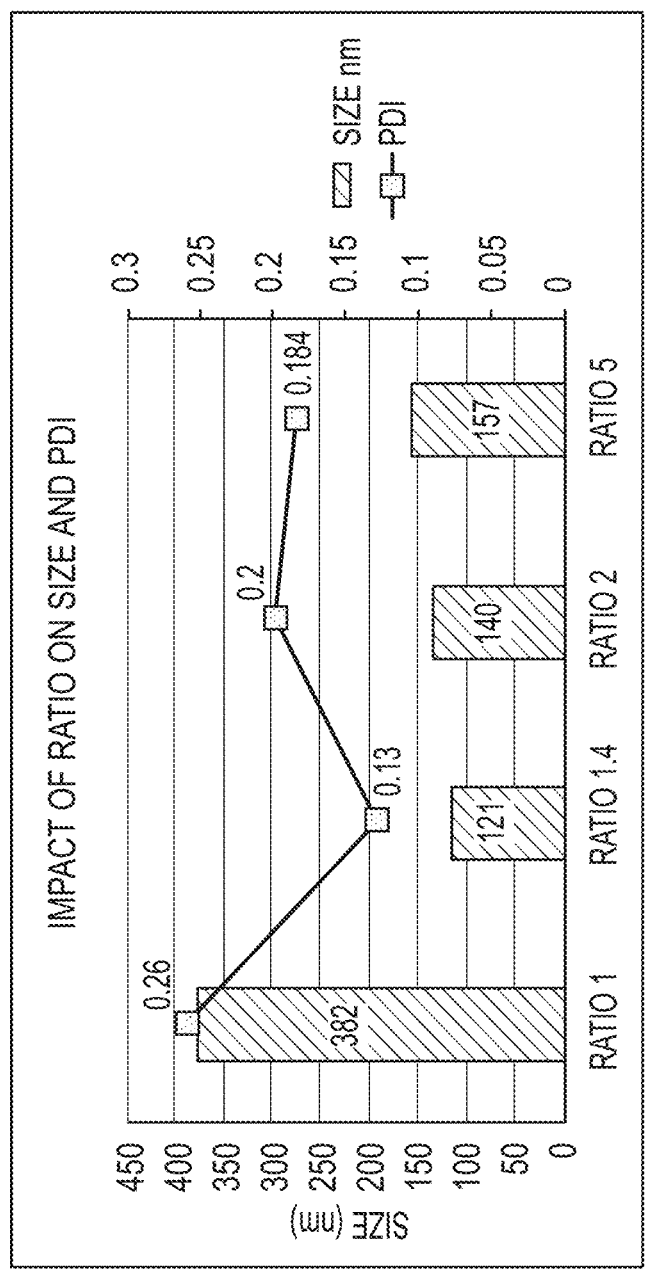
FIG. 4 shows the impact of aqueous:organic ratio on LNP size and PDI.
Figure 5:
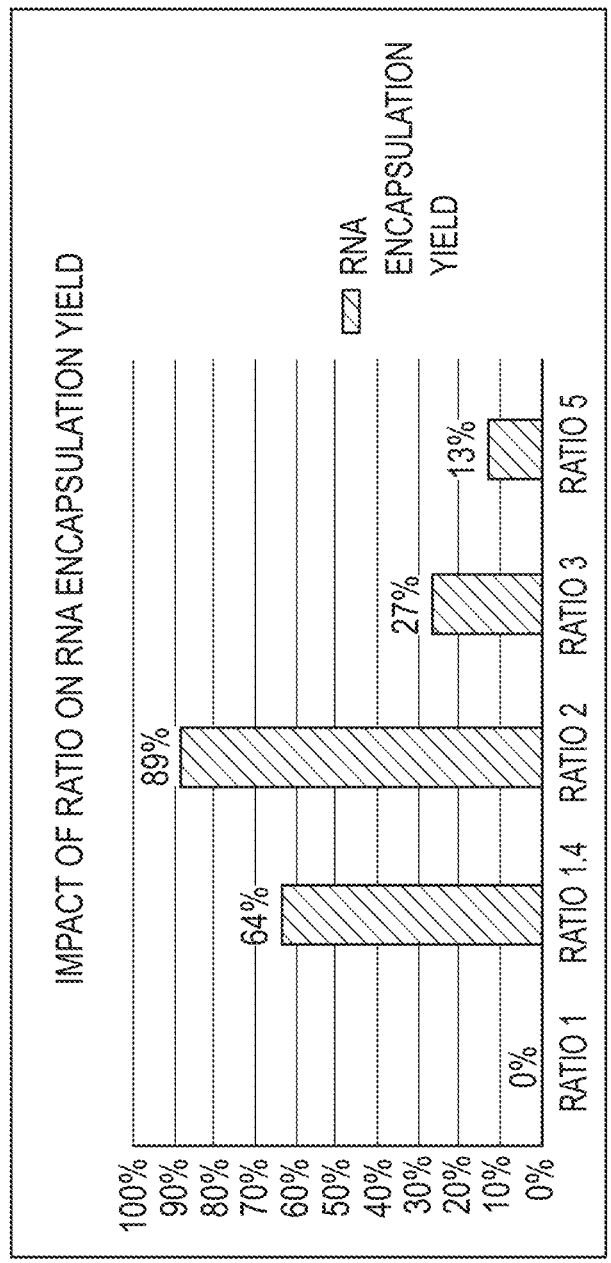
FIG. 5 shows the impact of aqueous:organic ratio on RNA encapsulation.

The effect of aqueous:organic ratio were investigated. Experiments were run at 18 ml/min TFR and results are shown in FIG. 4. Ratios close to 2 are observed to yield LNP having the closest size and PDI to the parameters described above. The effect on encapsulation was determined for this experiment. The results are shown in FIG. 5. Ratios close to 2 are observed to yield LNP having the highest RNA encapsulation.

(3) Stock Solution Concentration

Figure 6:
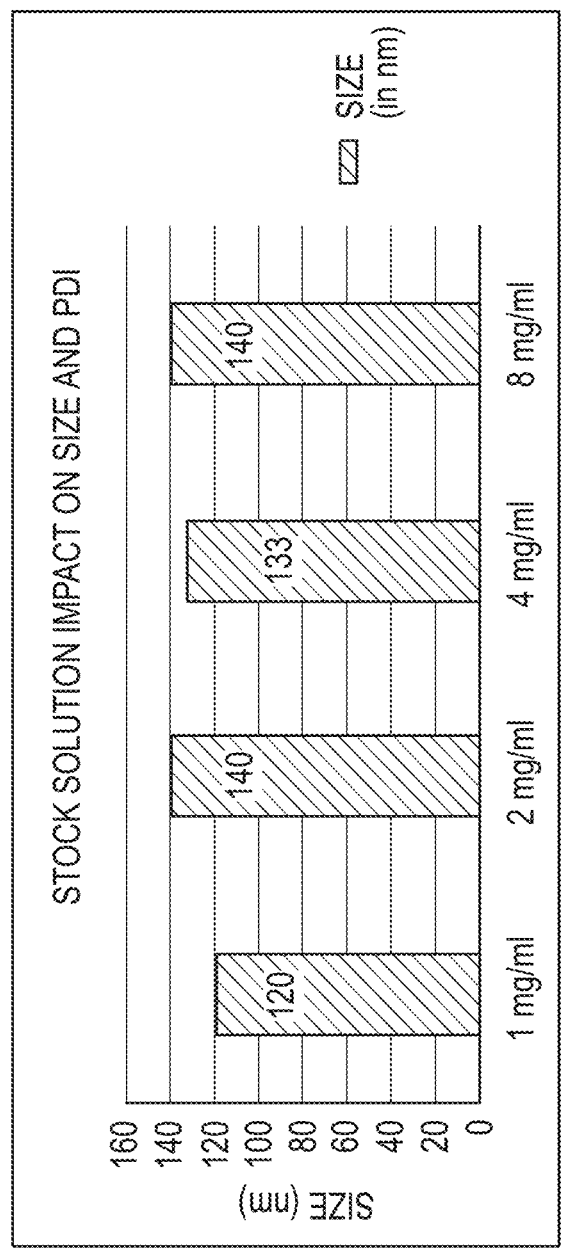
FIG. 6 shows the impact of stock solution concentration on LNP size and PDI.
Figure 7:
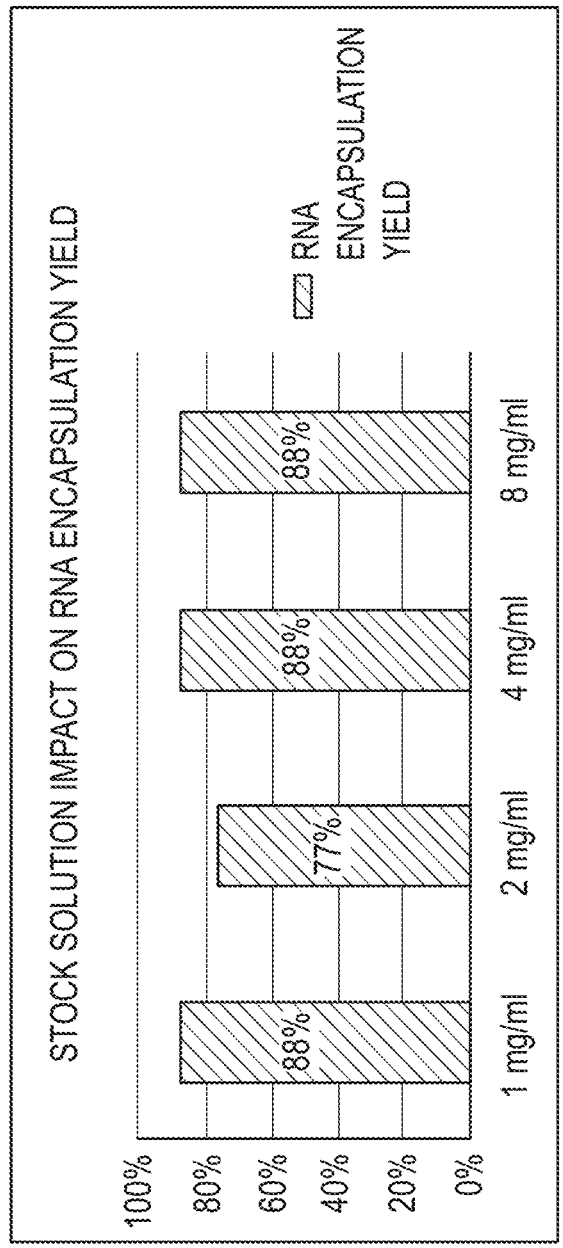
FIG. 7 shows the impact of stock solution concentration on RNA encapsulation yield.

For scaled up manufacturing of LNP, increased stock solution offers the potential for working at a lower volume before nanoprecipitation. The final product would be more concentrated, allowing greater formulation flexibility and analytical accuracy. Experiments were carried out a the aqueous:organic ratio of 2:1 and a minimum TFR of 18 mL/min. The results are shown in FIG. 6 and FIG. 7. These experiments demonstrate the capability to work at higher concentrations in the stock solution (tested up to 8 mg/ml of lipids) absent deleterious impact on LNP physico chemical attributes.

(4) Micro Fluidic Temperature.

Figure 8:
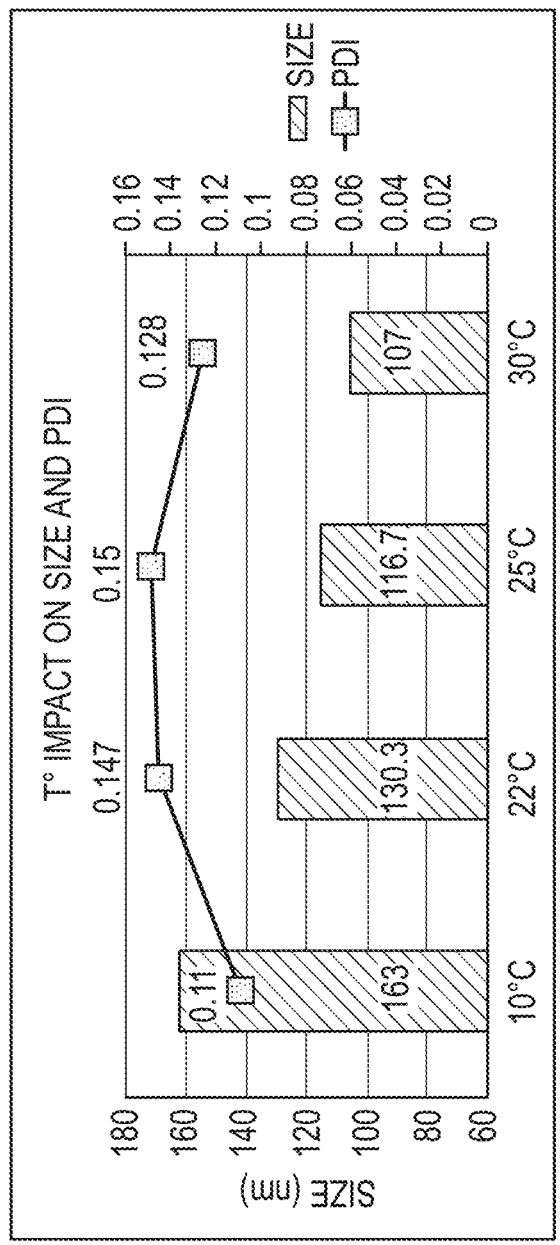
FIG. 8 shows the impact of T° on LNP size and PDI.
Figure 9:
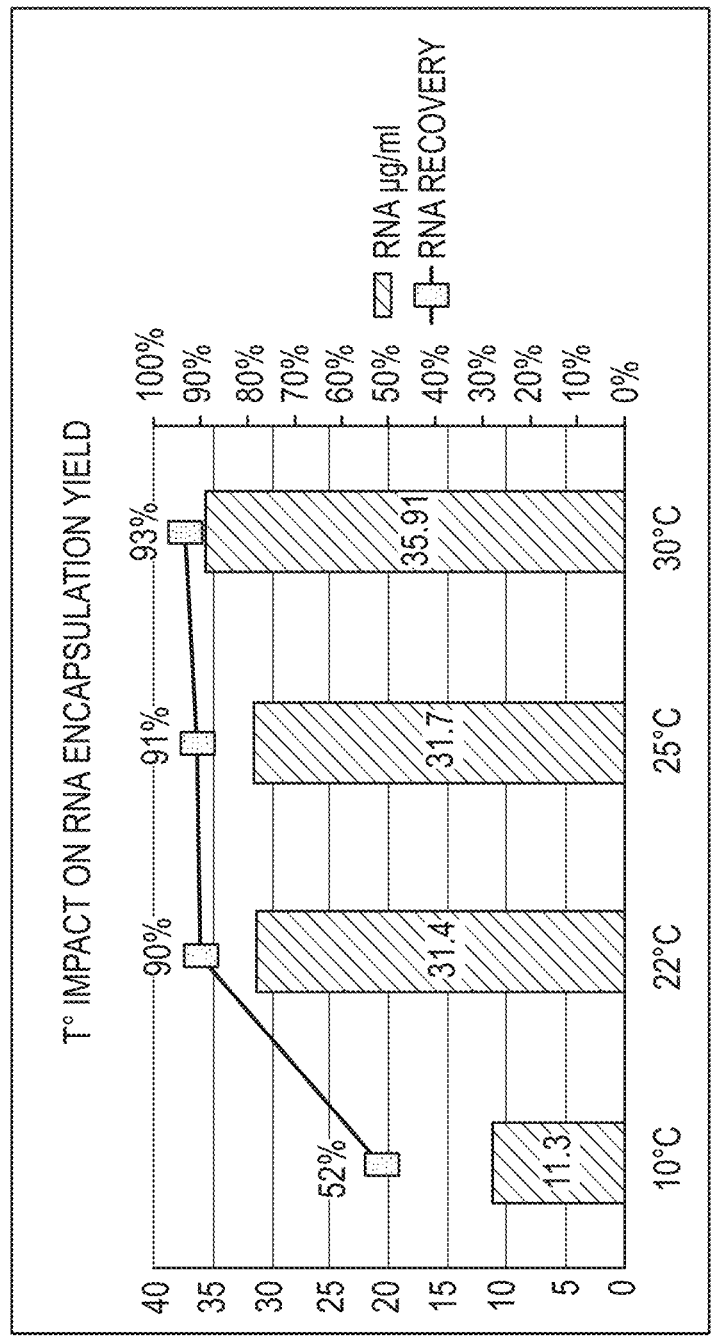
FIG. 9 shows the impact of T° on RNA encapsulation yield.

Process temperature was evaluated using the 2D vortex equipement in a temperature controlled container (Certomat). All experiments were run at aqueous/organic ratio 2:1 and TFR of 22 ml/min (with the exception of the 10° C. batch where the TFR was 18 ml/min). Results are shown in FIG. 8. Increasing temperature decreased the size of LNP down to about 107 nm at 30° C. The effect of temperature on encapsulation was also investigated. The results are shown in FIG. 9. At 10° C., the RNA encapsulation yield was decreased drastically to 52%. For conditions above 22° C., the encapsulation yield was over 90%.

(5) "All in One" Process.

Previous trials involved mixing one or more streams of lipids in an organic solvent solution with one or more streams of RNA in an aqueous solution. In this experiment, all lipid components were combined in one vessel and solubilized with solvent prior to microfluidic mixing with RNA as set forth in the following table.

TABLE 7

Impact of components in the stock preparation on physico-chemical attributes of LNP.

| Stock solution method preparation | SIZE | PDI | RNA amount by Ribodreen | Yield by ribodreen |
|---|---|---|---|---|
| Individual | 116.7 | 0.15 | 31.7 | 91% |
| All in one | 123.5 | 0.154 | 34.4 | 88% |

No impact was detected on physico-chemical attributes of LNP when the lipid stock solution is prepared with the all in one method.

Example 3

Morphology by Electron Microscopy

Morphological characterization of lipid nanoparticles containing mRNA by EM negative staining and cryo-EM analysis was carried out. The aim of this experiment was to obtain a morphological assessment by two methods (negative staining and cryoelectron microscopy) of lipid nanoparticles containing mRNA. See FIGS. 10 and 11.

TABLE 8

Sample tested for morphology by electron microscopy.

| Samples | Lipids amounts (mg/ml) | RNA encapsulation amount (µg/ml) | Buffer |
|---|---|---|---|
| SAM5-DTris | 1.6 | 34.7 | 10 mM pH 7.5 |

The LNP observed by negative staining were very heterogeneous in size and shape. While some displayed a relatively homogeneous contrast, most particles had a clear difference of density in several areas of the LNP. Some amorphous material aggregates and few membrane-like structures were seen as well. LNP in cryo-EM were heterogeneous in size and shape (FIGS. 10 and 11). Most displayed a heterogeneous asymmetric contrast. Again, given the low concentration of the sample, the observations were limited to relatively few LNP compared to those with negative staining.

Example 4

In this example RNA containing liposome were synthesized using the 2-D vortex microfluidic chip with the cationic lipid RV88 for delivery of mRNA.

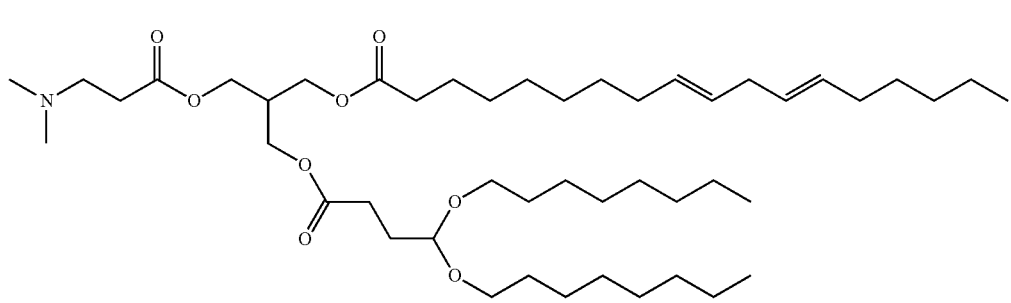

RV88

Materials

TABLE 9

| Materials and Instrument | Vendor | Cat # |
|---|---|---|
| 1M Tris-HCl, pH 8.0, Sterile | Teknova | T1080 |
| 5M Sodium Chloride solution | Teknova | S0250 |
| QB Citrate buffer, pH 6.0 (100 mM) | Teknova | Q2446 |
| Nuclease-free water | Ambion | AM9937 |
| Triton X-100 | Sigma-Aldrich | T8787-100ML |
| RV88 | GVK bio | |
| DSPC | Lipoid | 556500 |
| Cholesterol | Sigma | C3045-5G |
| PEG2K | Avanti Polar Lipids | 880150 |
| Ethanol | Acros Organic | 615090010 |
| mRNA | GSK TRD group | |
| 5 mL Borosilicate glass vials | Thermo Scientific | ST5-20 |
| PD MiniTrap G-25 Desalting Columns | GE Healthcare | VWR Cat. #95055-984 |
| Quant-iT RiboGreen RNA | Molecular Probes/ | R11490 |

TABLE 9-continued

| Materials and Instrument | Vendor | Cat # |
|---|---|---|
| Assay kit | Life Technologies | |
| Black 96-well microplates | Greiner | 655900 |

RV88, DSPC, and cholesterol all being prepared in ethanol at a concentration of 10 mg/ml in borosilica vials. The lipid 14:0-PEG2K PE was prepared at a concentration of 4 mg/ml also in a borosilica glass vial. Dissolution of lipids at stock concentrations was attained by sonication of the lipids in ethanol for 2 min. The solutions were then heated on an orbital tilting shaker set at 170 rpm at 37 C for 10 min. Vials were then equilibrated at 26 C for a minimum of 45 min. The lipids were then mixed by adding volumes of stock lipid as shown in Table 10. The solution was then adjusted with ethanol such that the final lipid concentration was 7.92 mg/ml

TABLE 10

Lipid components used to make liposomes with the cationic lipid RV88 and mRNA.

| Composition | MW | % | nmoles | mg | Stock (mg/ml) | ul | Ethanol (ul) |
|---|---|---|---|---|---|---|---|
| RV88 | 794.2 | 40% | 7200 | 5.72 | 10 | 571.8 | 155.3 |
| DSPC | 790.15 | 10% | 1800 | 1.42 | 10 | 142.2 | |
| Cholesterol | 386.67 | 48% | 8640 | 3.34 | 10 | 334.1 | |
| PEG2K | 2693.3 | 2% | 360 | 0.97 | 4 | 242.4 | |

RNA was prepared as a stock solution with 75 mM Citrate buffer at pH 6.0 and a concentration of RNA at 1.250 mg/ml. The concentration of the RNA was then adjusted to 0.1037 mg/ml with 75 mM citrate buffer at pH 6.0, equilibrated to 26 C. The solution was then incubated at 26 C for a minimum of 25 min.

The microfluidic chamber was cleaned with ethanol as described in example 1 and neMYSIS syringe pumps were prepared by loading an syringe with the RNA solution and another syringe with the ethanolic lipid. Both syringes were loaded and under the control of neMESYS software. The solutions were then applied to the mixing chip at an aqueous to organic phase ratio of 2 and a total flow rate of 22 ml/min (14.67 ml/min for RNA and 7.33 ml/min for the lipid solution. Both pumps were started synchronously. The mixer solution that flowed from the microfluidic chip was collected in 4×1 ml fractions with the first fraction being discarded as waste. The remaining solution containing the mRNA-liposomes was exchanged by using G-25 mini desalting columns to 10 mM Tris-HCl, 1 mM EDTA, at pH 7.5, as described above. Following buffer exchange, the materials were characterized for size, and RNA entrapment through DLS analysis and Ribogreen assays, respectively.

TABLE 11

Description of RV88
Liposome synthesis and biophysical characterization

| Sample Name | N:P Ratio | TFR ml/min | Ratio (aqueous/org phase) | RNA encapsulation amount (µg/ml) | RNA encapsulation yield % | size d · nm | PDI |
|---|---|---|---|---|---|---|---|
| SAM-RV88 | 8 | 22 | 2 | 35.87 | 96.42 | 105.97 | 0.09 |

Example 5

In this example RNA containing liposome were synthesized using the 2-D vortex microfluidic chip with the cationic lipid RV94 for delivery of mRNA.

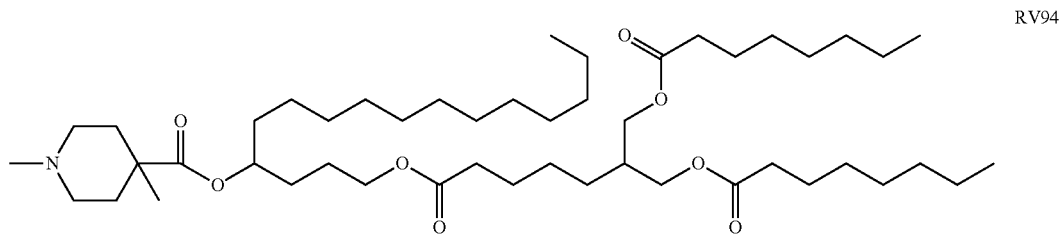 [SMILES: CCCCCCCCCCCCC(CCCOC(=O)CCCCC(COC(=O)CCCCCCC)COC(=O)CCCCCCC)OC(=O)C1(C)CCN(C)CC1]

RV94

Materials

TABLE 12

| Materials and Instrument | Vendor | Cat # |
|---|---|---|
| 1M Tris-HCl, pH 8.0, Sterile | Teknova | T1080 |
| 5M Sodium Chloride solution | Teknova | S0250 |
| QB Citrate buffer, pH 6.0 (100 mM) | Teknova | Q2446 |
| Nuclease-free water | Ambion | AM9937 |
| Triton X-100 | Sigma-Aldrich | T8787-100ML |
| RV94 | GVKbio | |
| DSPC | Lipoid | 556500 |
| Cholesterol | Sigma | C3045-5G |
| PEG2K | Avanti Polar Lipids | 880150 |
| Ethanol | Acros Organic | 615090010 |
| mRNA | GSK TRD group | |
| 5 mL Borosilicate glass vials | Thermo Scientific | ST5-20 |
| PD MiniTrap G-25 Desalting Columns | GE Healthcare | VWR Cat. #95055-984 |
| Quant-iT RiboGreen RNA Assay kit | Molecular Probes/ Life Technologies | R11490 |
| Black 96-well microplates | Greiner | 655900 |

The lipids were prepared as in Example 5 using the material amounts named in Table 12 to a final lipid concentration of 7.92 mg/ml.

TABLE 13

Lipid materials used to make RV94-based liposomes.

| Composition | MW | % | nmoles | mg | Stock (mg/ml) | ul | Ethanol (ul) |
|---|---|---|---|---|---|---|---|
| RV94 | 808.22 | 40% | 2880 | 2.33 | 10 | 232.8 | 155.3 |
| DSPC | 790.15 | 10% | 720 | 0.57 | 10 | 56.9 | |
| Cholesterol | 386.67 | 48% | 3456 | 1.34 | 10 | 133.6 | |
| PEG2K | 2693.3 | 2% | 144 | 0.39 | 4 | 97.0 | |

The aqueous solution of mRNA was prepared as a stock solution with 75 mM Citrate buffer at pH 6.0 the mRNA at 1.250 mg/ml. The concentration of the RNA was then adjusted to 0.1037 mg/ml with 75 mM citrate buffer at pH 6.0, equilibrated to 26° C. The solution was then incubated at 26° C. for a minimum of 25 min.

The microfluidic chamber was cleaned with ethanol as described in example 1 and neMYSIS syringe pumps were prepared by loading a syringe with the RNA solution and another syringe with the ethanolic lipid. Both syringes were loaded and under the control of neMESYS software. The solutions were then applied to the mixing chip at an aqueous to organic phase ratio of 2 and a total flow rate of 22 ml/min (14.67 ml/min for RNA and 7.33 ml/min for the lipid solution. Both pumps were started synchronously. The mixer solution that flowed from the microfluidic chip was collected in 4×1 ml fractions with the first fraction being discarded as waste. The remaining solution containing the mRNA-liposomes was exchanged by using G-25 mini desalting columns to 10 mM Tris-HCl, 1 mM EDTA, at pH 7.5, as described above. Following buffer exchange, the materials were characterized for size, and RNA entrapment through DLS analysis and Ribogreen assays, respectively. The biophysical analysis of the liposomes is shone in Table 14.

TABLE 14

Description of RV94 Liposome synthesis and biophysical characterization

| Sample Name | N:P Ratio | TFR ml/min | Ratio (aqueous/org phase) | RNA encapsulation amount (µg/ml) | RNA encapsulation yield % | size d · nm | PDI |
|---|---|---|---|---|---|---|---|
| SAM-RV94 | 8 | 22 | 2 | 31.46 | 86.9 | 113.1 | 0.12 |

Example 6

EC$_{50}$ Determination

Assessment of activity of mRNA carrying liposomes can be determined in vitro by high content imaging. In this example the mRNA-liposomes can be used to treat cells growing in culture. This experiment can use several types of cells growing in a 2-D culture. For this example, baby hamster kidney cells (BHK) cells obtained from Invitrogen (Cat #R700-01) were used. The cells were seeded in 96-well tissue culture plate with a seeding density of 200,000 cells/well in culture media (DMEM, 5% FBS, 1% Pen/Strep, 1% L-Glu). The culture plate was then incubated 4 hours allowing the cells to attach and adhere to the culture plate. The SAM-liposomes were serial diluted from 10 ng to 0.078 ng of mRNA in 8 dilution steps with growth medium containing 5% serum. A 100 ul volume of each dilution was transferred to respective wells with adherent cells. Growth media was cultured cells are then washed with PBS, and each concentration was run in repeats of 5-wells. The cells were then returned to the cell culture incubator overnight. The following day the media with SAM-liposome was removed from the cells and the cells are fixed with a % paraformaldehyde solution in dPBS for 15 min at room temperature. The cells were then washed and permeabilized using a 0.05% Triton X-100 solution in PBS for 15 min at room temperature. After blocking the cells were fixed and permeabilized cells with goat serum. Cells were then stained with primary and secondary Ab, where the secondary Ab is labeled with Alexa Fluor 488, and DAPI to stain the nuclei of the cells. The cells were then washed in PBS and sealed with transparent film. Cells were then analyzed using a ThermoFisher CellInsight CX7 HCA high content imaginer (HCI) and percentage of antigen expression was determined using HCS Studio Cell Analysis Software. Regression of Percentage of antigen expressing cells as a function of mRNA concentration was carried out with dose response simulation (log(agonist) vs response—four parameter variable slope regression) using a statistical software such as GraphPad Prism 7.00.

The EC$_{50}$ determinations were 0.0756 ng/well for liposome-RV39, 0.098 ng/well for liposome-RV88, and 0.069 ng/well for liposome RV94.

The invention claimed is:
1. A method of manufacturing a delivery system with a microfluidic device; the delivery system comprising a liposome and ribonucleic acid (RNA) molecules; the RNA molecules encoding an immunogen; the liposomes comprising lipids; the lipids comprising an ionizable cationic lipid; the liposome encapsulating at least half of the RNA molecules by mass; the microfluidic device comprising:
 (i) a mixing chamber;
 (ii) a first inlet into the mixing chamber, the first inlet into the mixing chamber being for delivery of a first solution into the mixing chamber, the first solution comprising an organic solvent and the lipids;
 (iii) a second inlet into the mixing chamber, the second inlet into the mixing chamber being for delivery of a second solution into the mixing chamber, the second solution comprising the RNA molecules and an aqueous solution; and
 (iv) an outlet out of the mixing chamber,
 wherein the direction of flow of each of the first solution and the second solution into the mixing chamber is within 10 degrees of the direction of flow through the mixing chamber;
the method comprising:
 (i) mixing in the mixing chamber the first solution and second solution, thereby obtaining a mixed material, the mixed material comprising the delivery system and the organic solvent;
 wherein the first solution and the second solution have a ratio between 1:1.5 and 1:3 of volume of the first solution to volume of the second solution and have a total flow rate into the mixing chamber from 8 mL per minute per mm$^2$ of cross-sectional area of the mixing chamber perpendicular to the direction of flow in the mixing chamber to 30 mL per minute per mm$^2$ of the cross-sectional area of the mixing chamber perpendicular to the direction of flow in the mixing chamber, and (ii) removing the organic solvent from the mixed material.

2. The method of claim 1, wherein the wherein the liposome has a polydispersity of 0.3 or lower.

3. The method of claim 1, wherein the ionizable cationic lipid a pKa of from 5.5 to 6.7.

4. The method of claim 1, wherein the mixing chamber is rectangular.

5. The method of claim 1, wherein the ionizable cationic lipid comprises a hindered ester group; a carbonate group; or an aromatic group in the core.

6. The method of claim 5, wherein the ionizable cationic lipid further comprises an unhindered ester group.

7. The method of claim 1, wherein the mixed material is collected before further processing, and optionally before the removing the organic solvent.

8. The method of claim 1, wherein the microfluidic device comprises one first inlet into each mixing chamber.

9. The method of claim 1, wherein the RNA molecule is a self-replicating RNA molecule.

10. The method of claim 1, wherein the cross-sectional area of the mixing chamber perpendicular to the direction of flow through the mixing chamber is from 0.6 mm$^2$ to 1.2 mm$^2$.

11. The method of claim 1, wherein the first solution and the second solution have the total flow rate into the mixing chamber from 12 mL per minute per mm$^2$ of the cross-sectional area of the mixing chamber perpendicular to the direction of flow through the mixing chamber to 28 mL per minute per mm$^2$ of the cross-sectional area of the mixing chamber perpendicular to the direction of flow through the mixing chamber.

12. The method of claim 1, wherein the cross-sectional area of the mixing chamber is from 0.6 mm$^2$ to 1.2 mm$^2$ and the first solution and the second solution have the total flow rate into the mixing chamber is from 12 mL per minute per mm$^2$ of the cross-sectional area of the mixing chamber perpendicular to the direction of flow through the mixing chamber to 28 mL per minute per mm$^2$ of the cross-sectional area of the mixing chamber perpendicular to the direction of flow through the mixing chamber.

13. The method of claim 1, wherein the first solution comprises from 1 mg of the lipids per mL of the organic solvent to 10 mg of the lipids per mL of the organic solvent.

14. The method of claim 13, wherein the organic solvent comprises ethanol and less than 30% water.

15. The method of claim 1, wherein the lipids further comprise a sterol, a polyethylene glycol conjugated lipid, and a zwitterionic lipid.

16. A method of manufacturing a delivery system with a microfluidic device; the delivery system comprising a liposome and ribonucleic acid (RNA) molecules; the liposome comprising lipids; the lipids comprising an ionizable cationic lipid; the liposome encapsulating at least half of the RNA molecules by mass; the RNA molecules encoding an immunogen; the microfluidic device comprising a plurality of mixing units; each mixing unit comprising:

(i) a mixing chamber
(ii) a first inlet into the mixing chamber,
(iii) a second inlet into the mixing chamber; and
(iv) an outlet out of the mixing chamber,
wherein:
(A) each first inlet into each mixing chamber is for delivery of a first solution into each mixing chamber; the first solution comprising an organic solvent and the lipids; the first solution being supplied to the plurality of the mixing units by a first pump;

(B) each second inlet into each mixing chamber is for delivery of a second solution into each mixing chamber; the second solution comprising the RNA molecules and an aqueous solution; the second solution being supplied to the plurality of the mixing units by a second pump; and (C) the direction of flow of each of the first solution and the second solution into each mixing chamber is within 10 degrees of the direction of flow through the mixing chamber;

the method comprising:

(i) mixing in a plurality of the mixing chambers the first solution and the second solution, thereby obtaining a mixed material, the mixed material comprising the delivery system and the organic solvent:

wherein the first solution and the second solution have a ratio between 1:1.5 and 1:3 of volume of the first solution to volume of the second solution and have a total flow rate into each mixing chamber from 8 mL per minute per mm$^2$ of cross-sectional area of the mixing chamber perpendicular to the direction of flow in the mixing chamber to 30 mL per minute per mm$^2$ of the cross-sectional area of the mixing chamber perpendicular to the direction of flow in the mixing chamber, and (ii) removing the organic solvent from the mixed material.

17. The method of claim 16, wherein the wherein the liposome has a polydispersity of 0.3 or lower.

18. The method of claim 16, wherein the ionizable cationic lipid has a pKa of from 5.5 to 6.7.

19. The method of claim 16, wherein each mixing chamber is rectangular.

20. The method of claim 16, wherein the ionizable cationic lipid comprises a hindered ester group; a carbonate group; or a aromatic group in the core.

21. The method of claim 20, wherein the ionizable cationic lipid further comprises an unhindered ester group.

22. The method of claim 16, wherein the mixed material is collected before further processing; and optionally before the removing the organic solvent.

23. The method of claim 16, wherein each mixing unit has one first inlet into each mixing chamber.

24. The method of claim 16, wherein the RNA molecule is a self-replicating RNA molecule.

25. The method of claim 16, wherein the cross-sectional area of each mixing chamber perpendicular to the direction of flow through the mixing chamber is from 0.6 mm$^2$ to 1.2 mm$^2$.

26. The method of claim 16, wherein the first solution and the second solution have the total flow rate into each mixing chamber from 12 mL per minute per mm$^2$ of the cross-sectional area of the mixing chamber perpendicular to the direction of flow through the mixing chamber to 28 mL per minute per mm$^2$ of the cross-sectional area of the mixing chamber perpendicular to the direction of flow through the mixing chamber.

27. The method of claim 16, wherein the cross-sectional area of each mixing chamber perpendicular to the direction of flow through the mixing chamber is from 0.6 mm$^2$ to 1.2 mm and the first solution and the second solution have the total flow rate into each mixing chamber from 12 per minute per mm$^2$ of the cross-sectional area of the mixing chamber perpendicular to the direction of flow through the mixing chamber to 28 per minute per mm$^2$ of the cross-sectional area of the mixing chamber perpendicular to the direction of flow through the mixing chamber.

28. The method of claim 16, wherein the first solution comprises from 1 mg of the lipids per mL of the organic solvent to 10 mg of the lipids per mL of the organic solvent.

29. The method of claim 28, wherein the organic solvent comprises ethanol and less than 30% water.

30. The method of claim 16, wherein the lipids further comprise a sterol, a polyethylene glycol conjugated lipid, and a zwitterionic lipid.

* * * * *